United States Patent [19]
Shin et al.

[11] Patent Number: 5,974,464
[45] Date of Patent: Oct. 26, 1999

[54] SYSTEM FOR HIGH SPEED SERIAL VIDEO SIGNAL TRANSMISSION USING DC-BALANCED CODING

[75] Inventors: Yeshik Shin; Kyeongho Lee; Sungjoon Kim, all of Seoul, Rep. of Korea; David D. Lee, Palo Alto, Calif.

[73] Assignee: Silicon Image, Inc., Cupertino, Calif.

[21] Appl. No.: 08/723,694

[22] Filed: Sep. 30, 1996

Related U.S. Application Data

[60] Provisional application No. 60/004,907, Oct. 6, 1995.

[51] Int. Cl.$^6$ .............................. G06F 13/38; G06F 15/17
[52] U.S. Cl. .............................. 709/231; 370/535; 341/58
[58] Field of Search ......................... 395/200.61, 200.76; 341/59, 94, 58; 370/535, 536, 463

[56] References Cited

U.S. PATENT DOCUMENTS

| | | | |
|---|---|---|---|
| 4,216,426 | 8/1980 | Flora | ......................................... 455/28 |
| 4,408,189 | 10/1983 | Betts et al. | .............................. 340/347 |
| 4,463,342 | 7/1984 | Langdon, Jr. et al. | .................. 340/347 |

(List continued on next page.)

FOREIGN PATENT DOCUMENTS

| | | |
|---|---|---|
| 0 556 981 A1 | 8/1993 | European Pat. Off. . |
| 88/06384 | 8/1988 | WIPO . |
| 92/22160 | 12/1992 | WIPO . |

OTHER PUBLICATIONS

Ivan J. Fair, et al; Guided Scrambling: A New Line Coding Technique for High Bit Rate Fiber Optic Transmission Systems, Feb. 2, 1991, pp. 289–296.

European Patent Office: International Preliminary Examination Report for International Application No. PCT/US 96/15738, Jan. 29, 1998.

*Primary Examiner*—Mark H. Rinehart
*Attorney, Agent, or Firm*—Fenwick & West LLP

[57] ABSTRACT

A new high-speed digital interface for transmitting video information over various transmission media including terminated copper wires such as twisted-pair wires and fiber optical cable is described. The significance of this new interface is that (1) it only uses a small number of data channels with all timing and control data embedded in data transmission, (2) it uses a transition controlled binary DC balanced coding for reliable, low-power and high-speed data transmission, (3) it uses low-swing differential voltage which minimizes EMI, and (4) it can be implemented in low-cost scaleable CMOS technology as a megacell or standard IC. The high-speed digital interface incorporates a method and apparatus for producing a transition-controlled, DC-balanced sequence of characters from an input sequence of data bytes. The bits in each of the data bytes are selectively complemented in accordance with the number of logical transitions in each data byte in order to produce selectively complemented data blocks. A cumulative disparity is then determined between the logical values of different type included within ones of the selectively complemented data blocks previously encoded into characters. In addition, a current disparity in a candidate character associated with a current one of the selectively complemented data blocks being encoded is also determined. The candidate character is assigned to the current one of the selectively complemented data blocks if the current disparity is of a polarity opposite to a first polarity of the cumulative disparity. Alternately, the complement of the candidate character is assigned to the current one of the selectively complemented data blocks if the current disparity is of the first polarity. In a high-transition mode of operation, the bits within data blocks including less than a minimum number of logical transitions are selectively complemented so that each such selectively complemented data block includes in excess of the minimum number of logical transitions. In a low-transition mode of operation, the bits within data blocks having more than a predefined number of logical transitions are selectively complemented so that each such selectively complemented data block includes less than the maximum number of logical transitions.

40 Claims, 15 Drawing Sheets

U.S. PATENT DOCUMENTS

| | | | |
|---|---|---|---|
| 4,464,765 | 8/1984 | Shimizu | 375/17 |
| 4,486,739 | 12/1984 | Franaszek | 340/347 |
| 4,528,550 | 7/1985 | Graves et al. | 340/347 |
| 4,584,695 | 4/1986 | Wong et al. | 375/81 |
| 4,677,421 | 6/1987 | Taniyama | 340/347 |
| 4,682,334 | 7/1987 | Le Mouel et al. | 371/55 |
| 4,709,170 | 11/1987 | Li | 307/511 |
| 4,710,922 | 12/1987 | Scott | 370/535 |
| 4,744,081 | 5/1988 | Buckland | 370/100 |
| 4,926,447 | 5/1990 | Corsetto et al. | 375/120 |
| 4,975,916 | 12/1990 | Miracle et al. | 371/47.1 |
| 5,022,051 | 6/1991 | Crandall et al. | 375/19 |
| 5,079,770 | 1/1992 | Scott | 370/536 |
| 5,132,633 | 7/1992 | Wong et al. | 328/14 |
| 5,200,979 | 4/1993 | Harris | 379/19 |
| 5,239,561 | 8/1993 | Wong et al. | 375/81 |
| 5,260,608 | 11/1993 | Marbot | 307/262 |
| 5,264,848 | 11/1993 | McGuffin | 341/94 |
| 5,268,937 | 12/1993 | Marbot | 375/121 |
| 5,295,079 | 3/1994 | Wong et al. | 364/484 |
| 5,304,952 | 4/1994 | Quiet et al. | 331/1 A |
| 5,329,251 | 7/1994 | Llewellyn | 331/2 |
| 5,329,559 | 7/1994 | Wong et al. | 375/119 |
| 5,339,050 | 8/1994 | Llewellyn | 331/16 |
| 5,359,301 | 10/1994 | Candage | 331/57 |
| 5,387,911 | 2/1995 | Gleichert et al. | 341/95 |
| 5,410,600 | 4/1995 | Toy | 380/9 |
| 5,420,545 | 5/1995 | Davis et al. | 331/18 |
| 5,438,621 | 8/1995 | Hornak et al. | 380/43 |

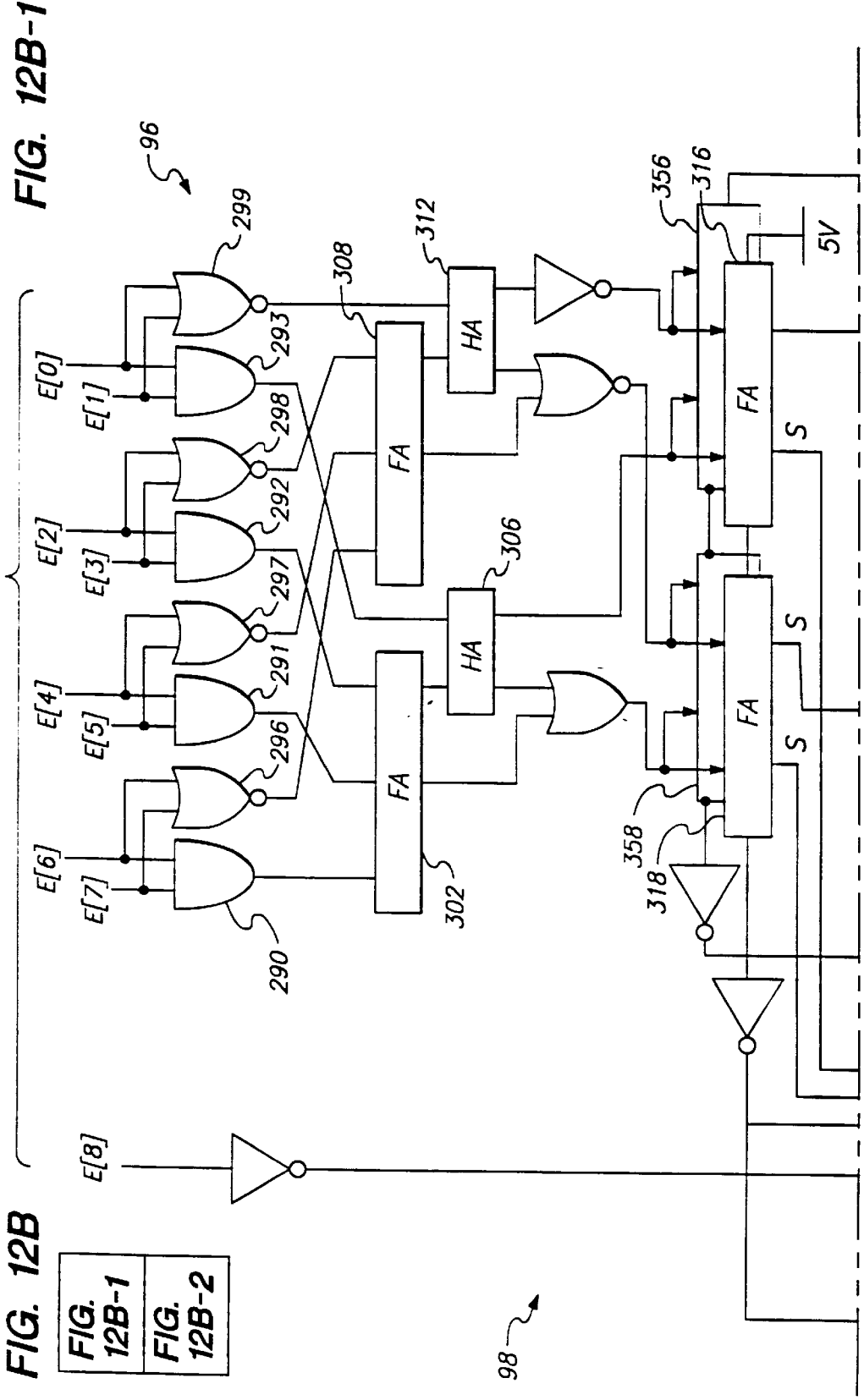

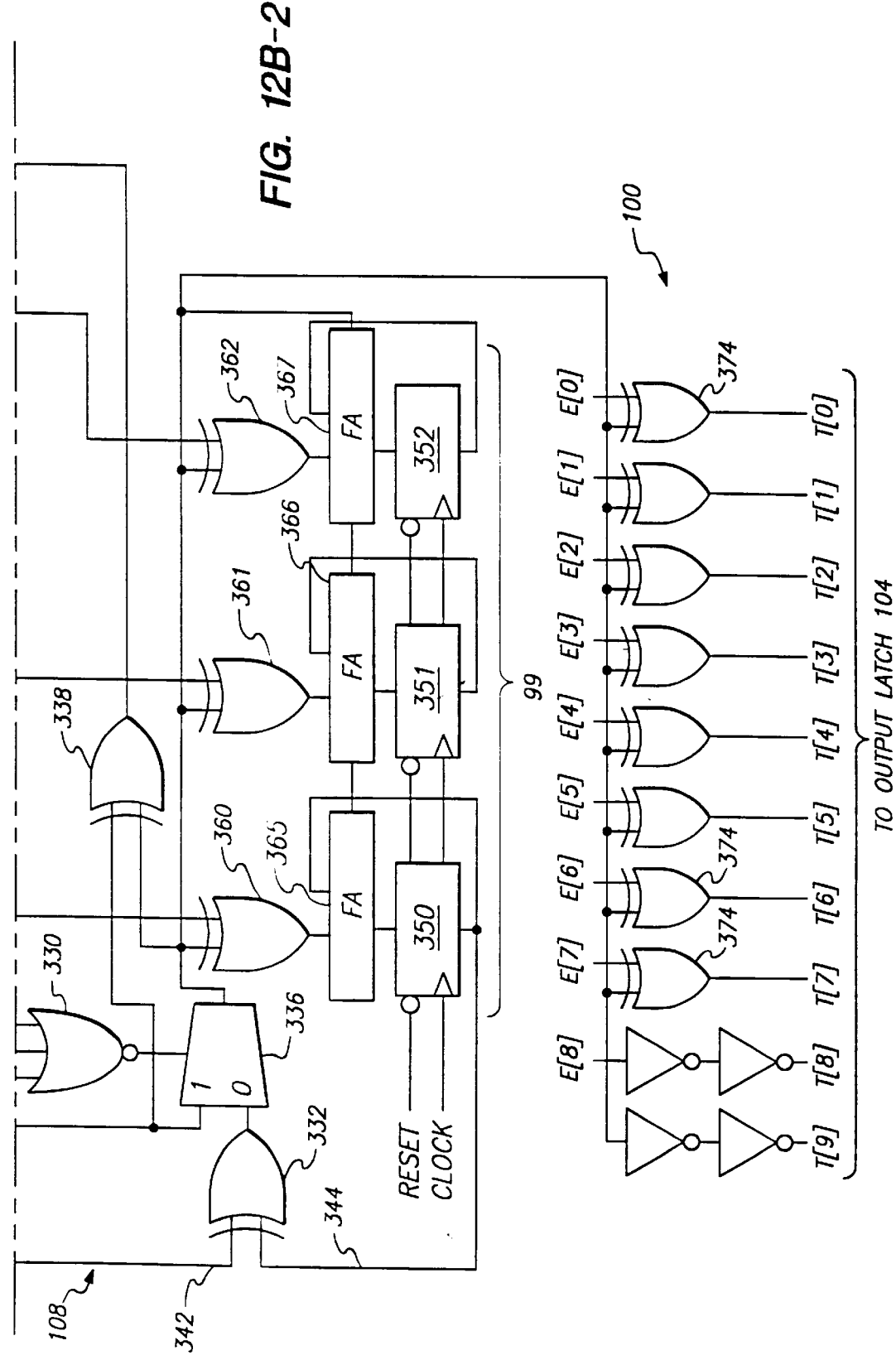

SYSTEM FOR HIGH SPEED SERIAL VIDEO SIGNAL TRANSMISSION USING DC-BALANCED CODING

This application claims the benefit of U.S. Provisional application No. 60/004,907 is pending entitled "High-Speed Digital Video Signal Transmission System" filed on Oct. 6, 1995.

BACKGROUND OF THE INVENTION

1. Field of the Invention

This invention relates to coding schemes for digital transmission systems. More particularly, the present invention relates to a DC-balanced, transition-controlled coding system in which rapid byte synchronization allows for prompt initiation of decoding.

2. Description of the Related Art

As electronic and computer technology continues to evolve, communication of information among different devices, either situated near by or at a distance becomes increasingly important. For example, it is now more desirable than ever to provide for high speed communications among different chips on a circuit board, different circuit boards in a system, and different systems with each other. It is also increasingly desirable to provide such communications at very high speeds, especially in view of the large amount of data required for data communications in intensive data consuming systems using graphical or video information, multiple input-output channels, local area networks, and the like.

It is particularly desirable to enable individual personal computers, workstations, or other computing devices, within which data is normally internally transferred using parallel data buses, to communicate with each other over relatively simple transmission lines. Such transmission lines typically include only one or two conductors, in contrast with the 64-bit and wider data paths within computing systems now commonly available In the case of video data transmission to computer displays, as well as in the case of high-speed video input from digital cameras to computer systems, existing interconnection interfaces typically employ such parallel data paths. Recently, the requisite bandwidth of such interconnection systems has increased as a consequence of increased display resolution. This has increased electromagnetic interference (EMI) as well as transmission line noise, thereby raising concerns as to safety and reliability. In addition, the large number of signal and data lines required by advanced liquid crystal display panels has increased the potential for mutual interference.

There have been a number of commercially available products which attempt to provide high speed conversion of parallel data to serial form and transmission over a serial link. The Hewlett-Packard G-link chip set is one such product. That chip set includes a transmitter set and is capable of handling 21-bit wide parallel data. To obtain the necessary speed, however, the chip set is fabricated using a bipolar process, and the receiver and transmitter require separate chips. Such a solution is highly power consumptive and expensive.

Another commercial solution has been provided by Bull of France. The Bull technology employs a frequency multiplier for parallel to serial data conversion. Such devices typically introduce noise into the silicon substrate and interfere with other multipliers on the chip. In addition, the Bull technology uses an exclusive OR tree for parallel to serial conversion. The use of exclusive OR trees is well known, together with the difficulty of equalizing the delay through all paths of such devices. Additionally, the Bull technology uses output signals having full logic swings. This results in slower performance.

Various techniques exist for improving the characteristics of transmission over serial links. For example, transmission codes may be employed to alter the frequency spectrum of the transmitted serial data so as to facilitate clock recovery and enable AC coupling. Each transmission code will also typically provide special characters, not included within the data alphabet, to be used in character synchronization, frame delimiting, as well as perhaps for diagnostic purposes. Coding may also be employed to reduce transmission bandwidth as a means of limiting the signal distortion occurring during propagation through the transmission medium. In the case of wire links, it is desirable to utilize codes with no DC and little low frequency content in order to allow for DC isolation of the driver and receiver circuitry from the transmission line, as well as to reduce signal distortion on the line. An efficient coding system should also be disposed to encode clock information with the encoded data in a manner allowing for extraction of the clock information during decoding. This obviates the need for provision of a separate clock signal over a dedicated clock line, since the clock information recovered during decoding may be instead used by the receiver circuitry.

Within local area networks (LANs), transmission coding schemes exist for converting words of various length to characters of greater length. For example, three-bit words may be converted to four-bit characters (3B/4B), four-bit words may be converted to five-bit characters (4B/5B), and so on. Typically, coding and decoding is achieved using a "key" in which each word is mapped to a corresponding character. Unfortunately, the complexity of this type of mapping scheme generally precludes utilization of random logic, and often requires implementations involving look-up tables or the like. This is disadvantageous given that look-up tables realized using ROM consume significant chip area and tend to slow circuit operation.

A particular 8B/10B coding scheme is described in U.S. Pat. No. 4,486,739. In particular, a binary DC balanced code and associated encoder circuit are described as being operative to translate an 8 bit byte of information into 10 binary digits for transmission. The 8B/10B coder is partitioned into a 5B/6B plus a 3B/4B coder. Despite ostensibly facilitating DC-balanced encoding, this system tends to require relatively lengthy encoding and decoding intervals.

Although progress has been made in the development of coding techniques disposed to facilitate serial data transmission, there remains a need for a coding scheme capable of efficiently supporting very high speed serial data transmission. Such a coding scheme should also be DC-balanced in order to facilitate AC coupling and clock recovery. In addition, it would be desirable to provide a coding scheme capable of facilitating real-time data transfer by allowing for rapid synchronization during decoding.

SUMMARY OF THE INVENTION

This invention provides a high-speed video data transmission system capable of converting parallel video data stream and video display timing and control signals to three high-speed serial data channels at speeds capable of supporting high-resolution displays (800 by 600 color pixels and above resolutions) and digital video input/output sources/destinations. Despite enabling reliable and safe (low EMI) data transmission at high rate to support a variety of video I/O devices, the invention can be fabricated relatively inexpensively using low-cost CMOS technology. In addition, the technique employed lowers power consumption requirement and also makes the total silicon area required small, such that it can be integrated into an ASIC as a megacell.

The interface proposed here also employs a new DC balanced coding scheme for an efficient implementation and low power operation, and a method of embedding timing and video control signals into the data streams, which reduces further the number of wires required. Interconnect system described in this invention can be applied to interfacing LCDs and other flat-panel display using digital interface and built-in digital CCD camera for notebook computers for reliable and safe video transmission or remote display application where distance between display and the host system is relatively long. In the latter case, the transmission media can be fiber optics which use serial digital signal as proposed in the invention rather than analog video signal used for the cathode ray tubes.

As noted above, the high-speed transmission system of the invention utilizes a transition-controlled, DC-balanced sequence of characters from an input sequence of data bytes. The bits in each of the data bytes are selectively complemented in accordance with the number of logical transitions in each data byte in order to produce selectively complemented data blocks. A cumulative disparity is then determined between the logical values of different type included within ones of the selectively complemented data blocks previously encoded into characters. In addition, a current disparity in a candidate character associated with a current one of the selectively complemented data blocks being encoded is also determined. The candidate character is assigned to the current one of the selectively complemented data blocks if the current disparity is of a polarity opposite to a first polarity of the cumulative disparity. Alternately, the complement of the candidate character is assigned to the current one of the selectively complemented data blocks if the current disparity is of the first polarity.

In a high-transition mode of operation, the bits within those of the data blocks including less than a minimum number of logical transitions are selectively complemented in order that each such selectively complemented data block include in excess of the minimum number of logical transitions. In a low-transition mode of operation, the bits within those of the data blocks having more than a predefined number of logical transitions are selectively complemented in order that each such selectively complemented data block includes less than the maximum number of logical transitions. During both high-transition mode and low-transition mode encoding of each such selectively complemented data block into an encoded character, a predefined bit is set indicating that selective complementing has been effected.

In another aspect, the present invention comprises a high speed digital signal transmission system. The system includes an encoder for encoding digital input data into data characters and for encoding control data into control characters. Each of the data characters have a first plurality of logical transitions within a first range, and each of the control characters have a second plurality of logical transitions in a second range different from the first range. The data and control characters are converted into a serial data stream and transmitted over a communication link.

The high speed digital signal transmission system further includes a deserializer for receiving the serial data stream from the communication link and for recovering received data and control characters therefrom. The received control characters are distinguished from the received data characters on the basis of numbers of logical transitions detected therein. A decoder, coupled to the deserializer, is operative to decode the received data and received control characters.

BRIEF DESCRIPTION OF THE DRAWINGS

Additional objects and features of the invention will be more readily apparent from the following detailed description and appended claims when taken in conjunction with the drawings, in which:

FIGS. 12A and 12B provide a schematic representation of an exemplary implementation of the encoder.

DESCRIPTION OF THE PREFERRED EMBODIMENT

I. High-Speed Digital Video Signal Transmission System

Figure 1:
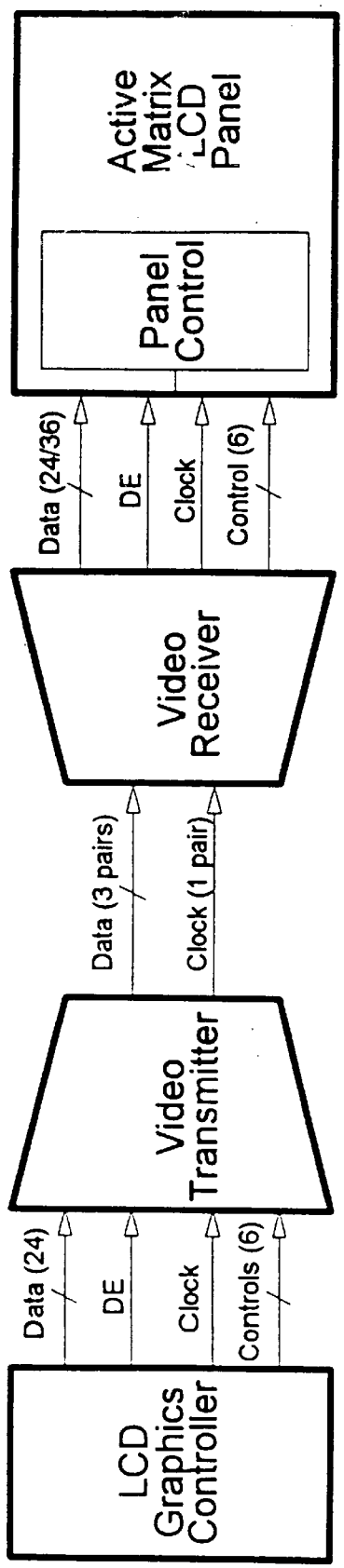
FIG. 1 shows a high-level block diagram of a high-speed digital video signal transmission system in which high-speed video transmission is effected between a host computer system and a system display

FIG. 1 shows a high-level block diagram of a high-speed digital video signal transmission system in which high-speed video transmission is effected between a host computer system and a system display. The high-speed digital video signal transmission system provides parallel interfaces to both the computer system's display/graphics controller and the display devices. This obviates the need for modification of the existing system other than with respect to the addition of high-speed digital transmitter and receiver modules contemplated by the present invention.

Figure 2:
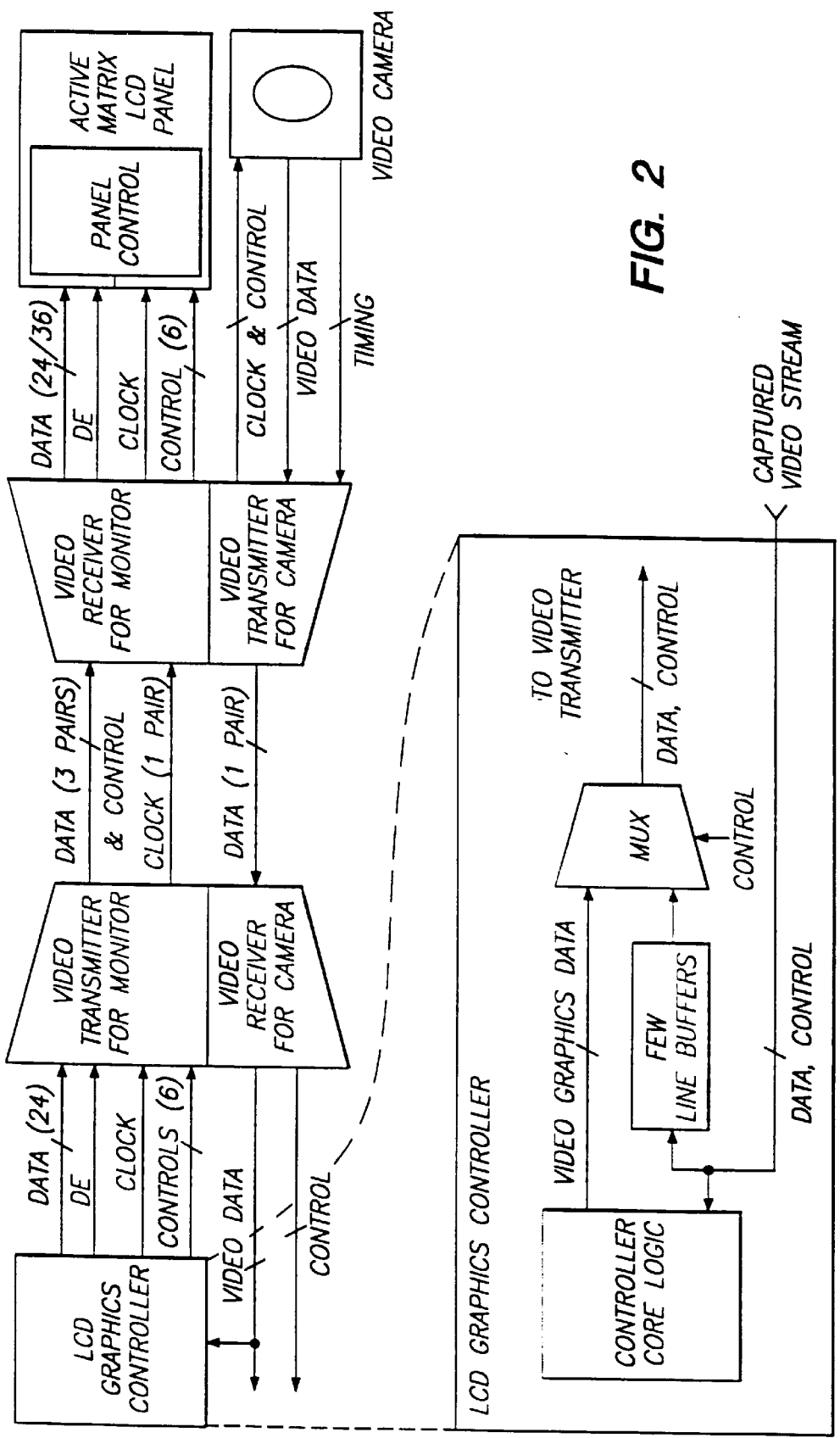
FIG. 2 shows an exemplary implementation of a high-speed bi-directional video signal transmission between a host computer system, a system display, and a digital video camera

FIG. 2 shows an exemplary implementation of a high-speed bi-directional video signal transmission between a host computer system, a system display, and a digital video camera. The system provides parallel interfaces to both the computer system's display/graphics controller and the display device and digital camera. In addition to the video interconnect system of FIG. 1, this interconnect system adds video transmitter and receiver for digital video input device. Only a single transmission clock line (from the host controller) is necessary to be provided as a consequence of the employment of a skew insensitive, delay-adjustment scheme. The delay adjustment scheme of the present invention improves upon conventional video capture techniques, which generally operate synchronously relative to the host computer and display. Hence, the incorporation of captured video into the graphics display subsystem of the host computer requires substantial buffering in order to synchronized the captured video to the data currently being displayed.

In contrast, the implementation of the present invention shown in FIG. 2 provides a common clock to both a display device and to a video capture device (e.g., a video camera). Since both video capture and display devices are operated under the same clock, both operations can be synchronized so that captured video can be forwarded to display without being buffered. That is, the video capture device need not operate synchronously relative to the video display system. If some video processing is needed and creates a time delay between the time of video capture and the time of subsequent display, one can adjust timing to insert intentional delay on the path. Often, the captured video data is routed to video/graphics controllers (e.g. VGA chip) to be processed and mixed with on-going graphical display. Such a controller can easily implement the synchronous video capture and displaying operations using the proposed scheme. This not only eliminates possible undesired side effect caused by asynchronous interface between video capture and displaying, but also reduces the complexity (hence the cost) of buffering and synchronization of the captured video.

Figure 3:
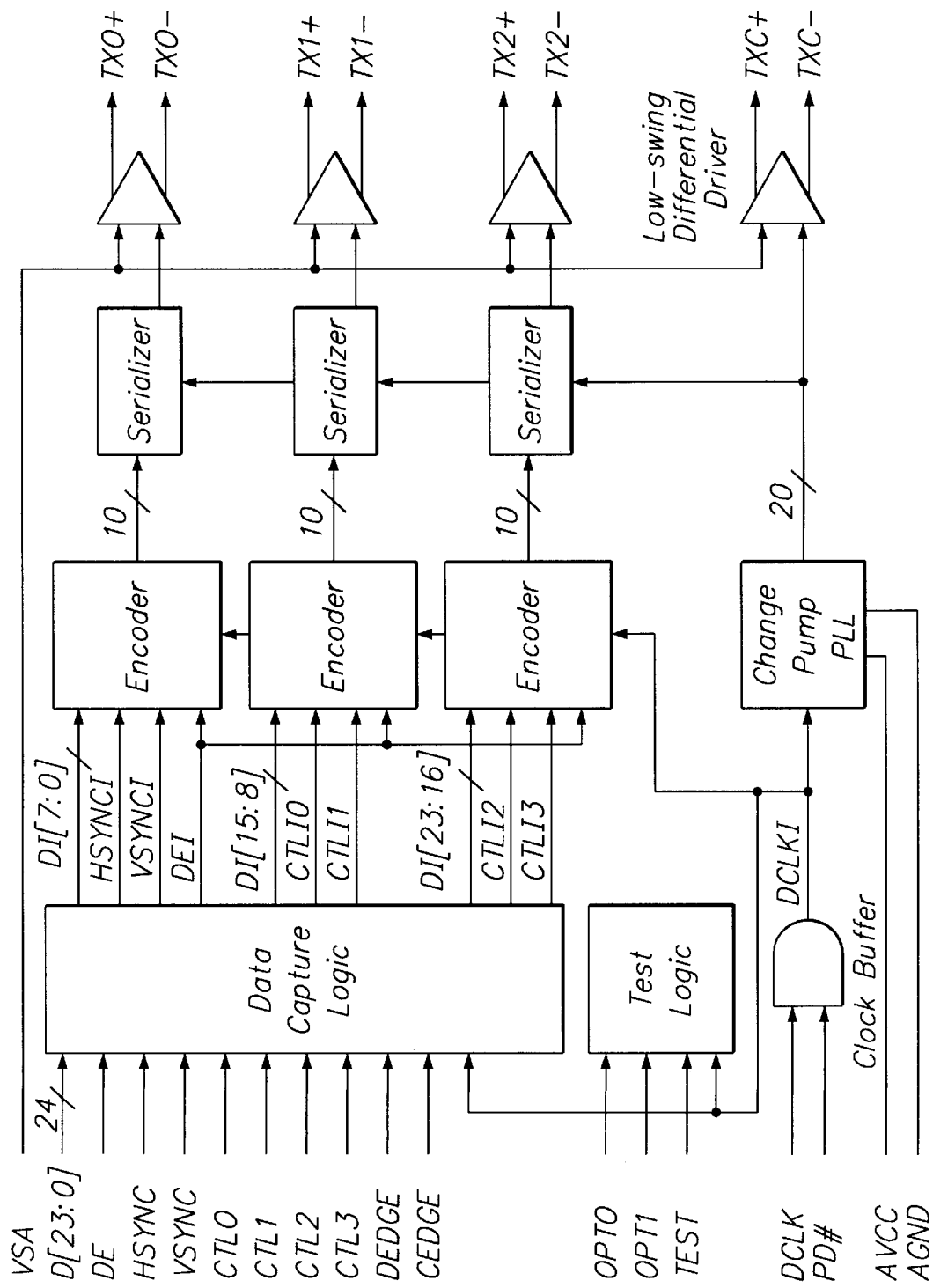
FIG. 3 shows a functional block diagram of a preferred implementation of a video link transmitter of the present invention.

FIG. 3 shows a functional block diagram of a preferred implementation of a video link transmitter of the present invention. The video link transmitter of FIG. 3 is amenable to realization as an integrated circuit, and consists of a data capture logic block, three data encoders, three serializers and three high-speed channel drivers. The clock is also being transmitted on an extra channel with data channels. The data encoder converts 8 bits of data into 10 bits of transition controlled, DC balanced data.

Figure 4:
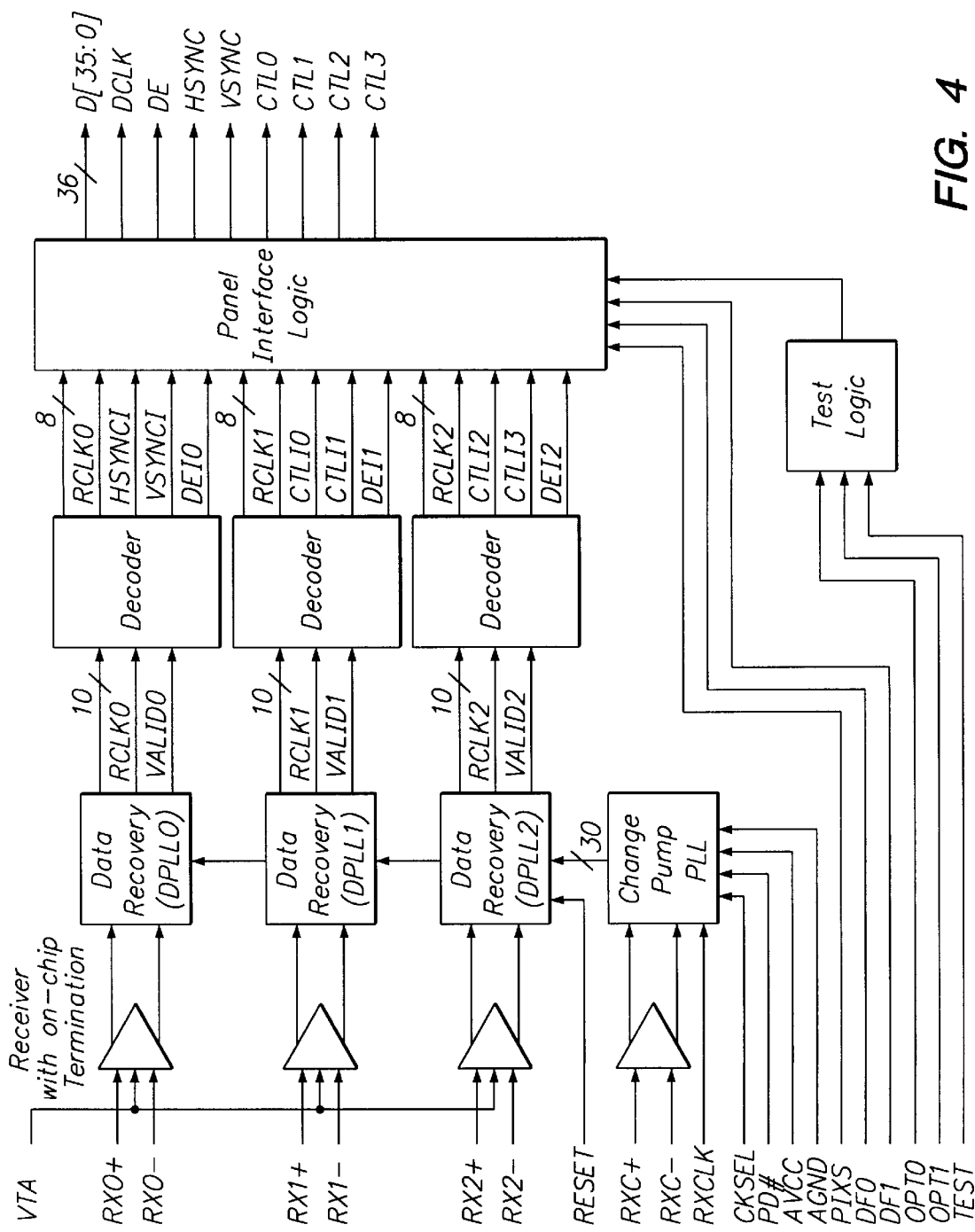
FIG. 4 shows a functional block diagram of a video receiver in accordance with the present invention.

FIG. 4 shows a functional block diagram of a video receiver in accordance with the present invention. The video link receiver chip consists of three differential receiver circuits, three data recovery modules, three decoders, and panel interface logic. In FIG. 4, the CKSEL pin selects the clock source for the receiver chip. When CKSEL is low; the receiver chip clock is derived from transmitted clock which goes to the RXC+ and RXC− pins. When CKSEL is high, the receiver chip clock is derived from the RXCLK pin. In normal application, the host graphics controller may use different clock frequencies for different modes, therefore the receiver clock should normally be derived from the clock transmitted by the transmitter chip which goes to the RXC+ and RXC− pins. However, there may be a situation/application where the data is always transmitted with a predetermined clock frequency. In this case the clock needs not be transmitted and a clock can be inputted in the RXCLK pin with frequency matching the transmitter clock frequency.

Figure 5:
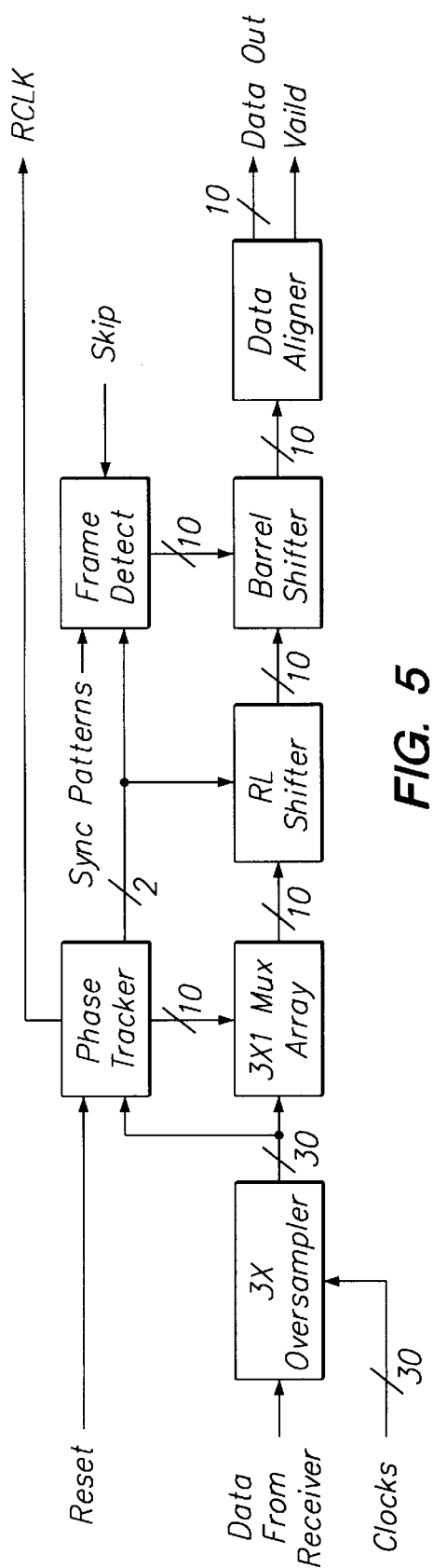
FIG. 5 provides a block diagram representation of data recovery logic within the video receiver.

FIG. 5 provides a block diagram representation of data recovery logic within the video receiver. The data recovery logic takes data from receiver circuit and multi-phased clocks from PLL to generate oversampled data and subsequently selects 10-bit DC-balanced output (Data Out), data valid (Valid) signal, and data recovery clock (RCLK). Reset input should only be used for testing purpose. During normal operation, there will be no Reset on the receiver chip.

A Data valid (Valid) signal signifies that output data (Data Out) is valid. Data valid signal will be at low level prior to data transmission and at initial stage of transmission when received data is not yet recognized by the data recovery logic. When data valid signal is low, output data (Data Out) is not valid and may contain illegal code therefore output data should be ignored.

Output data (Data Out) should be synchronous to data recovery clock (RCLK) and should be latched on rising edge of RCLK in the decoder logic which follows the data recovery logic.

The high-speed digital signal transmission technique of the present invention provides a number of important practical benefits for giga-baud serial communication. It can improve the speed in data conversion by simple and well characterized coding algorithm compared with the conventional coders which use mapping function. While the sender encodes the information into the two signal bands according to the groups into which the byte belongs, data or command, the receiver distinguishes the signal band based on the frequency-of-occurrence of transition within the transmitted symbol. Furthermore, it reduces the preambling time by loading the sync. position to the byte sync. pointer in the DPLL. It provides also robust lock mechanism in the clock synchronization between the counterparts by equalizing the preambling pattern and link idle pattern.

As shown in FIG. 3, each encoder unit will encode 8-bit of data, data enable (DE), and 2-bit of control signals using the encoder described in the previous section. Three functionally identical encoders will be used to transmit all data and control signals. The encoder will generate 10-bit DC-balanced codes. Control signals are assumed to change only during blank time (when DE is low/inactive), therefore the level of the control signals are assumed to be constant during active data area when DE is high.

There are two ways to do the encoding of the control signals when DE is low. The first method is to encode transitions (rise/fall) of the control signals and the second method is to encode the levels (high/low) of control signals. If control signals transitions are encoded, the receiver chip will use set-reset flip-flops for the control signals and it will use the transition codes to generate set and reset pulses for the flip flops.

If encoding transitions of control signals, a total of 265 DC-balanced codes are required for each encoder as shown in the following table:

| Data [7:0] | DE   | Control 1 | Control 0 | 10-bit code     |
|------------|------|-----------|-----------|-----------------|
| 1 to 256   | High | —         | —         | $C_1$–$C_{256}$ |
| —          | Low  | no change | no change | $C_{257}$       |
| —          | Low  | no change | rising    | $C_{258}$       |
| —          | Low  | no change | falling   | $C_{259}$       |
| —          | Low  | rising    | no change | $C_{260}$       |
| —          | Low  | falling   | no change | $C_{261}$       |
| —          | Low  | rising    | rising    | $C_{262}$       |
| —          | Low  | rising    | falling   | $C_{263}$       |
| —          | Low  | falling   | rising    | $C_{264}$       |
| —          | Low  | falling   | falling   | $C_{265}$       |

The main advantage of encoding transitions of control signals is the fact that during blank time (when DE is low), $C_{257}$ will be generated very often and can therefore be used as 'periodic synchronization code' by the receiver chip. However, when encoding transitions of control signals it is necessary to send control signal 'transition' code when DE falls to transmit the state of the control signals even if there is no actual control signal transitions. This is important, in case the control signals never make any transitions, to periodically initialize the control signal set-reset flip-flop on the receiver chip. So, for example, if when DE falls Control 1 is at high level and Control 0 is at low level, then encoder must output $C_{263}$ code. If encoding levels of control signals, a total of 260 10-bit DC-balanced codes are required for each encoder as shown in the following table:

| Data [7:0] | DE | Control 1 | Control 0 | 10-bit code |
|---|---|---|---|---|
| 1 to 256 | High | — | — | $C_1$–$C_{256}$ |
| — | Low | Low | Low | $C_{257}$ |
| — | Low | Low | High | $C_{258}$ |
| — | Low | High | Low | $C_{259}$ |
| — | Low | High | High | $C_{260}$ |

The advantage of encoding levels of control signals is the fact that it requires less number of codes but during blank time there is no guarantee that any one of the four extra codes ($C_{257}$, $C_{258}$, $C_{259}$, $C_{260}$) will occur more often than others. Therefore if 'periodic synchronization code' is desired, it is important that all four of the extra codes can be used for synchronization. The method of encoding levels of control signals is much preferred compared to the method of encoding transitions of control signals because it results in better initialization of control signals outputs on the receiver chip (it is possible that before the graphics chip is initialized there is no transition on DE signal and control signals, in which case the control signal set-reset flip-flops may be initialized in the wrong state for some period of time and therefore may cause potential damage to the panel).

Exemplary Implementation of Video Link Circuit Techniques for Low-Power, High-Speed Data Transmission A digital video link is composed of 3 data lines and an accompanying clock line with a reduced, differential logic swing with a DC-balanced coding for transformer or capacitor coupling. Signal transmission media can be either a terminated copper wires such as twinax cable or twisted pair or an optical fiber, in this case a driver and an amplifier for a laser diode and a PIN diode respectively are a signal load and a source for the video link. The voltage swing on the copper is adjustable but 500 mV is the typical recommended voltage. Since its swing is differential on the copper, the net signal on the wire has a swing twice larger than the single-ended signal. Since a differential swing of 1V is large enough to drive a receiver we might be able to reduce the voltage swing depending on the quality and length of the wire without sacrificing its performance. In fact, since the voltage on the cable is developed by the current supplied by the transmitter, with reduced swing, we can reduce the power dissipation. Also, with a larger characteristic impedance on the cable, we might develop the same voltage with reduced amount of current, reducing the power further. Therefore, it is very important to make the transmitter have an externally adjustable current level, in case when a standard level is not used for maximal current reduction. Since we use a low-swing signal on only four terminated lines, there will be significantly reduced electromagnetic interference(EMI) while fully parallel wires radiate enormous EMI with the unterminated lines acting as many antennas.

Video signals are composed of three separate signals, typically RGB, along with two synchronization signals called HSYNC and VSYNC. Instead of having extra lines, those two SYNC signals are mixed with the RGB data in the coder, thereby limiting the number of data wires to three.

In a normal PC or workstation environment, video transmission is uni-directional, i.e. from the computer to the monitor. However, in a multimedia environment where video conferencing is prevalent, a video signal from a camera attached on the monitor might have to send video data backward. In such case we need to assign a separate channel. In this invention, instead of adding a completely separate channel, we share a clock for both directions reducing the number of wires. This is possible due to the invented skew-insensitive data recovery scheme where blind over-sampling is performed on the data before full data recovery.

Transmitter

The transmitter is, basically, a high data rate parallel link connected side by side on the same die sharing a clock. It accepts three separate parallel data streams and converts them into three serial streams. The clock line does not bear the same frequency as the data rate on the transmission wire. Instead, a frequency of a parallel data which is only one-tenth of the required clock is conveyed.

One of the advantages of this scheme is power reduction. The required sampling clocks of the data rate is generated by the on-chip Phase Locked Loop (PLL).

Receiver

The receiver recovers the transmitter's data stream using a low-frequency clock provided with three serial data streams. Since there is no assumption on the related timing between clock and three data lines, the receiver blindly oversamples the data with the multiphase clocks and digital logic extracts data in later stages in the digital domain. The multiphase clocks are generated in the PLL from the reference clock that is brought with the data lines. Since only one data is selected as an output out of three sampled data, only one sampler will be activated after correct timing is determined. The remaining two will be deactivated until the next timing adjustment is needed, resulting in power-saving. Since three channels might have different line length, the correct sampling time will be different from channel to channel. The correct sampling time is individually obtained and correct word is assembled from three data to form a parallel data from the information of intermittent synchronizing patterns.

In what follows, a transition-controlled encoding scheme suitable for incorporation within the high-speed digital video signal transmission system of the present invention is described with reference to FIGS. 6–13B.

II. Encoding System Overview

Figure 6:
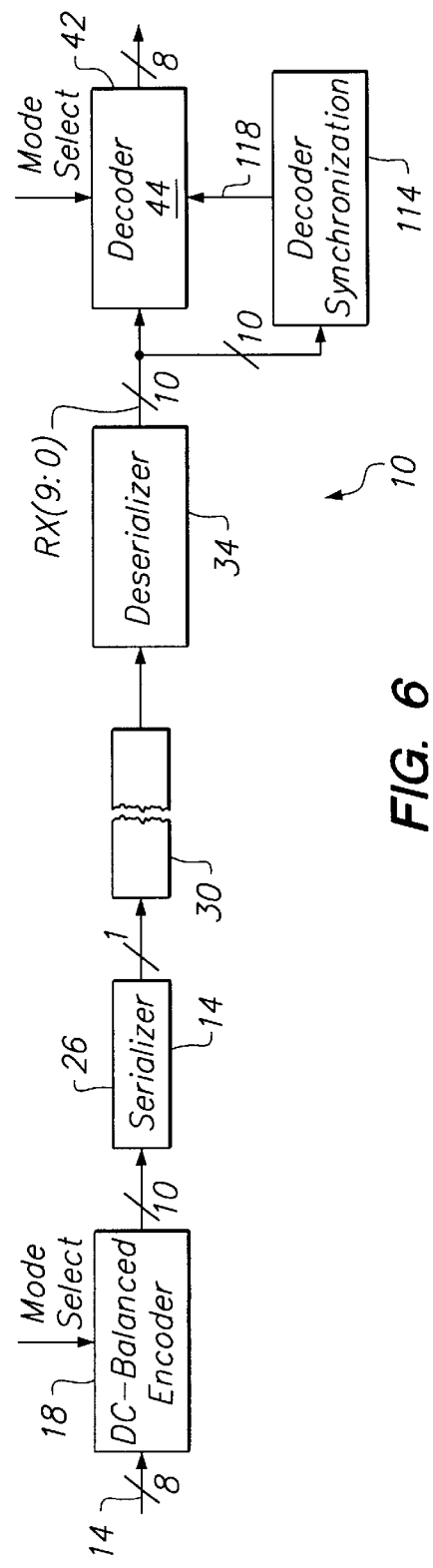
FIG. 6 is a block diagram depicting a DC-balanced encoding system of the present invention implemented within a high-speed digital transmission system.

FIG. 6 is a block diagram depicting a transition-controlled, DC-balanced encoding system capable of implementation within a high-speed digital transmission system 10. In the system 10 of FIG. 6, 8-bit bytes of parallel data 14 are provided to a DC-balanced encoder 18 operative to effect transition-controlled, DC-balanced 8B/10B coding. The resultant 10B encoded characters 22 are provided to a serializer 26 disposed to convert the 10-bit characters into a serial data stream for transmission over a serial data link 30 (e.g., an optical fiber cable, or twisted-pair copper wire). As is described herein, the relatively straightforward mathematical characteristics of the encoding algoridun performed by the encoder 18 allow for economical, high-speed implementations in random logic. The serial data stream is received from the serial data link 30 by a deserializer 34 and converted into 10-bit character data 38. The 10-bit character data 38 is then decoded into 8-bit data bytes 42 by a decoder 44. As is described hereinafter, both the encoder 18 and decoder 44 may be economically realized using simple digital logic circuits capable of real-time data processing.

III. DC-Balanced Transition-Controlled Encoding and Decoding System

The following provides a detailed description of the 8B/110B transition-controlled coding scheme carried out within the encoder 18. The transition-controlled code disclosed herein contemplates the use of either a high-transition or low-transition set of "in-band" code characters. Each high-transition in-band code character is derived from an input data byte in which four or more logical transitions exist between the eight bits thereof. Similarly, each low-transition in-band code character is derived from an input data byte in which fewer than four logical transitions exist between its eight bits. This scheme takes advantage of the fact that 128 of the 258 eight-bit ASCII codes include four or more logical transitions, and the remaining 128 ASCII codes include fewer than four logical transitions.

It has been found that each of the 128 eight-bit codes including fewer than four logical transitions may be mapped to a corresponding eight-bit code having four or more logical transitions, and vice-versa. As is described herein, this mapping may be achieved by complementing predefined bits in each eight-bit code to be mapped. During high-transition mode encoding, the bits within those input bytes having fewer than four logical transitions are selectively complemented and thereby mapped to bytes having four or more logical transitions. Alternately, during low-transition mode encoding the bits within those input bytes having four or more logical transitions are also selectively complemented and thereby mapped to bytes having fewer than four logical transitions. During both encoding modes, a bit of predefined value is appended to the selectively complemented byte in order to produce an intermediate 9-bit encoded symbol prior to creation of a corresponding 10-bit encoded character. When the input byte includes the number of logical transitions mandated by the current encoding mode (i.e, high-transition mode or low-transition mode), the appended bit is set to the complement of the predefined value in order to identify which of the 9-bit intermediate symbols include selectively complemented bytes. This results in the entire set of 256 eight-bit codes being made available for encoding into 10-bit characters during both low-transition mode and high-transition mode operation.

It may thus be appreciated that each eight-bit code converted into a 10-bit encoded character during high-transition mode operation includes four or more logical transitions. Similarly, each eight-bit code converted into a 10-bit encoded character during low-transition mode operation includes less than four logical transitions. These sets of 10-bit encoded characters capable of being produced during high-transition and low-transition modes of operation may be characterized as a high-transition set of "in-band" encoded characters, and a low-transition set of in-band encoded characters, respectively. Beyond the 256 in-band characters within the high-transition set and the 256 in-band characters of the low-transition set, there exists a high-transition set of 256 out-of-band 10-bit characters and a low-transition set of 10-bit characters. In accordance with another aspect of the invention, various synchronization and other special characters are defined using the high-transition and low-transition sets of out-of-band characters. Each character corresponding to one of these "out-of-band" characters associated with the high-transition set includes less than four logical transitions, and each of the out-of-band characters associated with the low-transition set of code characters includes more than four logical transitions. The difference in the number of transitions between in-band and out-of-band characters allows selected out-of-band characters to serve as control characters, and to be readily distinguished from in-band characters within the transmitted data stream.

Given the relatively high number of transitions within each of the in-band characters of the high-transition set, the high-transition set of characters may advantageously be employed to facilitate timing recovery. On the other hand, the low number of transitions within the code characters of the low-transition set makes this set of characters ideal for use in applications in which it is desired to minimize power consumption and/or electromagnetic interference (EMI).

In accordance with one aspect of the invention, the synchronization characters associated with both the low-transition and high-transition sets of code characters are selected so as to facilitate rapid synchronization during data recovery. When the low-transition set of code characters is being employed, a special group of out-of-band characters is used during synchronization. Each special synchronization character includes a predefined number larger than four (e.g., 7) of logical transitions between binary character values, and a predefined number (e.g., two) of "non-transitions" between character values. As will be discussed below, the special synchronization characters are selected such that random logic may be used to distinguish each special synchronization character from the in-band characters of the low-transition set. The following constitutes an exemplary set of out-of-band synchronization characters for use with the low-transition set of code characters:

1100101010
1101001010
1101010010
1101010100

It is a feature of the invention that if one of the above out-of-band synchronization characters is transmitted three or more consecutive times within any preamble period, the synchronization character is ensured of being detected during the associated data recovery process. In this regard a "preamble" sequence is sent during a preamble period preceding each transmission of encoded characters. The transmission of preamble sequences may occur not only as part of system initialization, but also at various other times to ensure that synchronization is maintained between encoding and decoding processes.

The coding scheme of the present invention is predicated on particular characteristics of the 256 different 8-bit binary code values. Referring to TABLE I, the 256 different 8-bit binary codes may be divided into eight groups G0–G7, where the binary codes within each group G0–G7 include the same number of transitions. It is observed that each binary code within group G0 can be converted to a corresponding binary code within group G7 by inverting alternate bits within the group G0 code. In the same way, each of the binary codes within groups G1, G2 and G3 may be converted to one of the binary codes within groups G6, G5 and G4, respectively, through inversion of alternate bits. As is described herein, the high-transition set of 10-bit characters is obtained by encoding of the 8-bit binary codes in groups G0–G3, and the low-transition set obtained by encoding groups G4–G7.

TABLE I

| GROUP | NUMBER OF TRANSITIONS | NUMBER OF BYTES IN GROUP | EXAMPLE BYTES IN GROUP |
| --- | --- | --- | --- |
| G0 | 0 | 2 | 00000000, 11111111 |
| G1 | 1 | 14 | 00000001, 11111110 |
| G2 | 2 | 42 | 00000010, 11111101 |
| G3 | 3 | 70 | 00000101, 11111010 |
| G4 | 4 | 70 | 00001010, 11110101 |
| G5 | 5 | 42 | 00010101, 11101010 |
| G6 | 6 | 14 | 00101010, 11010101 |
| G7 | 7 | 2 | 01010101, 10101010 |

During operation of the encoder 18 in a high-transition encoding mode, each 8-bit binary code within byte groups G0–G3 provided thereto is converted to a corresponding binary code within byte groups G4-G7 through inversion of alternate bits. Conversely, during operation in the low-transition encoding mode, each 8-bit binary code within groups G4-G7 provided to encoder 18 is mapped to a corresponding binary code within groups G0–G3. In the exemplary embodiment, the inversion of alternate bits is effected through the inversion of the even bits of the 8-bit binary codes. When the alternate bits of a given 8-bit code have been so inverted, a predefined bit within the resulting 10-bit encoded character derived from the given eight-bit code is set so as to indicate that mapping has occurred between byte groups.

Figure 7:
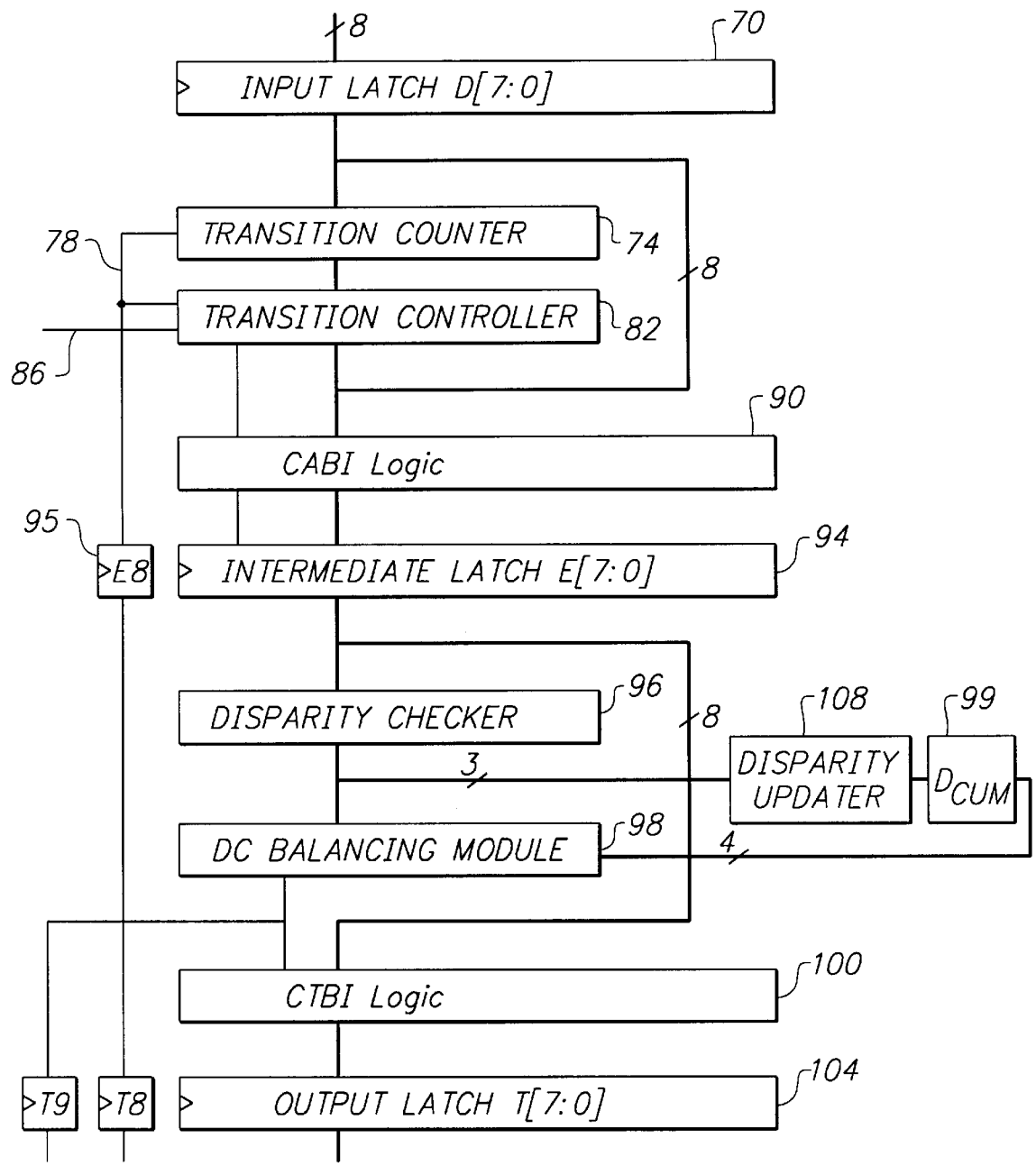
FIG. 7 shows the overall functional organization of a DC-balanced encoder of the present invention in the form of a data flow chart.

Referring now to FIG. 7, the overall functional organization of the transition-controlled DC-balanced encoder 18 of the present invention is shown in the form of a data flow chart. In FIG. 7, the 8-bit parallel data 14 to be encoded is latched within an input latch 70 comprised of, for example, eight D-type flip-flops. A transition counter 74 is operative to count the number of transitions (T) in logical value between adjacent bits of each byte of parallel data 14 within latch 70. If $D_7, D_6, \ldots D_0$, (i.e., D[7:0] comprise the eight bits of data latched within the input latch 70, then the transition counter 74 may determine T as follows:

$$T := (D_7 \operatorname{xor} D_6) + (D_6 \operatorname{xor} D_5) + (D_5 \operatorname{xor} D_4) +$$
$$(D_4 \operatorname{xor} D_3) + (D_3 \operatorname{xor} D_2) + (D_2 \operatorname{xor} D_1) + (D_1 \operatorname{xor} D_0)$$

A COUNT line 78 is set to a predefined logical value by counter 74 if more four or more logical transitions are counted between bits of the latched byte (T>3), and is set to the complement of the predefined logical value otherwise (T≦3). In what follows it will be assumed that COUNT=0 if four or more logical transitions are counted by counter 78 (T>3), and that COUNT =1 otherwise (T ≦3).

As is indicated by FIG. 7, a transition controller 82 is responsive to COUNT line 78 and to a mode select line 86. Mode select line 86 determines whether encoding is to be performed using the high-transition set or the low-transition set of code characters. When mode select line 86 indicates high-transition encoding is in effect, and COUNT line 78 registers that less than four logical transitions exist within the byte stored within latch 70, the transition controller 82 instructs conditional alternate bit inversion (CABI) logic 90 to invert the even bits the byte stored within latch 70. The resultant conditionally inverted byte, which will have four or more logical transitions, is stored within intermediate latch 94. Conversely, if high-transition encoding is in effect and four or more logical transitions are counted within the byte stored in the input latch 70, the transition controller 82 causes CABI logic 90 to simply transfer the byte from latch 70 (without bit inversion) to the intermediate latch 94. Accordingly, during high-transition encoding mode, if T < 4,
then E[8:0] = '1' $D_7\overline{D}_6D_5\overline{D}_4D_3\overline{D}_2D_1\overline{D}_0$,
else if T ≧ 4,
then E[8:0] = '0' $D_7D_6D_5D_4D_3D_2D_1D_0$ where E[7:0] comprise the eight bits stored within the intermediate latch 94, and E[8] comprises the value of COUNT stored within COUNT latch 95.

When mode select line 86 indicates that low-transition encoding has been selected, and COUNT line 78 registers that four or more logical transitions are present within the byte stored within latch 70, the transition controller 82 instructs conditional alternate bit inversion (CABI) logic 90 to invert the even bits the byte stored within latch 70. Otherwise, if low-transition encoding being performed and four or more logical transitions are counted within the byte stored in the input latch 70, the stored byte is simply transferred without bit inversion to the intermediate latch 94. Accordingly, during low-transition encoding mode, if T > 3, then E[8:0] = '1' $D_7\overline{D}_6D_5\overline{D}_4D_3\overline{D}_2D_1\overline{D}_0$,
else E[8:0] = '0' $D_7D_6D_5D_4D_3D_2D_1D_0$ After CABI logic 90 has provided a byte having a number of logical transitions within the appropriate range to latch 94, a DC-balancing process is performed in which the cumulative disparity between complementary logical values within the stream of 10-bit encoded characters produced by the encoder 18. As used herein, the term "cumulative disparity" ($D_{cum}$) denotes the excess of one bits relative to zero bits produced by the encoder 18 subsequent to synchronization being achieved with the decoder 44 in the manner described below. The term "current disparity" ($D_{cur}$) refers to the excess of one bits to zero bits within the byte currently stored within the latch 94, and is determined by disparity checker 96. A DC-balancing module 98 serves to compare the current disparity to the cumulative disparity stored within latch 99. The result of the comparison is then used to determine whether the byte stored within latch 94 is inverted by conditional byte inversion (CTBI) logic 100 during the course of transfer thereof to output register 104. In this way CTBI logic 100 serves to minimize the cumulative disparity associated with the serial stream produced by the encoder 18. The following provides a logical description of the manner in which each of the 10-bit characters T[9:0] in the DC-balanced character stream produced by the encoder are derived from the byte E[7:0] stored within the intermediate latch 94 and the bit E[8] within COUNT latch 95.

The current disparity ($D_{cur}$) is computed by the disparity checker 96 as follows:

$$D_{cur} := \{(E_7 \text{ and } E_6) + (E_5 \text{ and } E_4) + (E_3 \text{ and } E_2) + (E_1 \text{ and } E_0)\} -$$
$$\{(E_7 \text{ nor } E_6) + (E_5 \text{ nor } E_4) + (E_3 \text{ nor } E_2) + (E_1 \text{ nor } E_0)\}$$

It is noted that during operation in the high-transition mode, $-2 \leq D_{cum} \leq 2$, while during operation in the low-transition mode $-4 \leq DP \leq 4$. Within the DC-balancing module 98, if it is determined that $D_{cur} = 0$ or $D_{cum} = 0$, then if $E_8 = $ '0'
    then T[9:0] = '1' $E_8\overline{E_7}E_6\overline{E_5}E_4\overline{E_3}E_2\overline{E_1}E_0$, and
    $D'_{cum} = D_{cum} - D_{cur}$
else if $E_8$ is not equal to zero,
    then T[9:0] = '0' $E_8\overline{E_7}E_6\overline{E_5}E_4\overline{E_3}E_2\overline{E_1}E_0$, and
    $D'_{cum} = D_{cum} + D_{cur}$ where $D'_{cum}$ is the updated cumulative disparity computed by disparity updater 108 and stored thereby within latch 99.

Alternately, if the DC-balancing module determines that the most significant bit (MSB) of $D_{cur}$ and the MSB of $D_{cum}$ are not equivalent, then $$T[9:0] = \text{'0'} E_8 E_7 E_6 E_5 E_4 E_3 E_2 E_1 E_0, \text{ and}$$

$$D'_{cum} = D_{cum} + D_{cur} - E_8$$

Finally, in all other cases if the MSB of $D_{cur}$ and the MSB of $D_{cum}$ are equivalent, then, then $$T[9:0] = \text{'1'} E_8 \overline{E_7} \overline{E_6} \overline{E_5} \overline{E_4} \overline{E_3} \overline{E_2} \overline{E_1} \overline{E_0}, \text{ and}$$

$$D'_{cum} = D_{cum} - D_{cur} + E_8$$

In this way the cumulative disparity is reduced, and DC balance achieved, through selective inversion of the byte E[7:0] by CBI logic 100 during the course of filling the output latch 104 as T[7:0]. It is observed that the logical value of T[8] is indicative of whether the even bits of byte D[7:0] received at input latch 70 were complemented during generation of the byte E[0:8]. Similarly, the logical value of T[9] indicates whether byte E[7:0] was inverted during transfer to latch 104.

IV. Decoding

Referring to FIG. 6, the deserializer 34 receives the sequence of 10-bit characters T[9:0] produced by the encoder and generates 10-bit parallel received data upon bit lines $RX_9, RX_8, \ldots, RX_0$ (i.e., RX[9:0]). This 10-bit parallel received data is provided over bit lines RX[9:0] to the decoder 44, as well as to a decoder synchronization module 114. As is described below in section IV, the synchronization module 114 is operative to ascertain boundaries within the 10-bit parallel received data corresponding to the frame boundaries of the transmitted data (i.e., to T[9:0]). Specifically, synchronization module 114 determines upon which of the bit lines RX[9;0] the deserializer 34 is providing the received bits corresponding to the first bit T[0] of each transmitted byte T[9:0]. Upon making this determination, the synchronization module 114 provides a frame boundary pointer 118 to decoder 44 identifying the one of the bit lines RX[9:0] corresponding to the first bit T[0] of each transmitted 10-bit character T[9:0]. Upon receiving this synchronization information, the decoder 44 is disposed to decode the received data RX[9:0] in the following manner.

Figure 8:
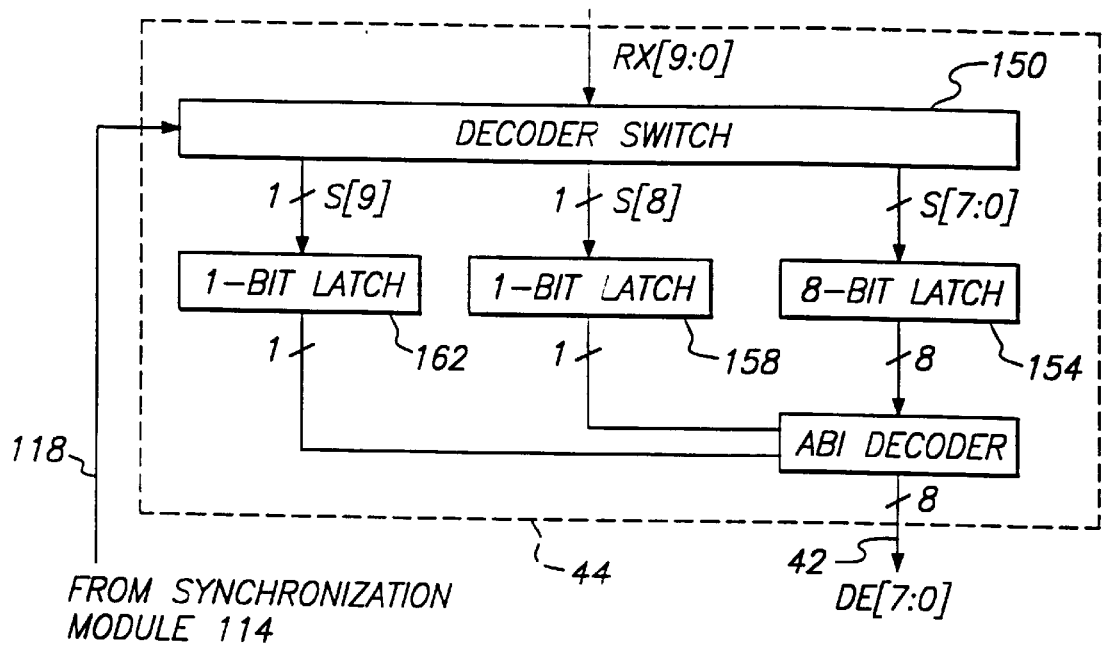
FIG. 8 provides a block diagrammatic representation of a decoder included within the transmission system of FIG. 6.

FIG. 8 provides a block diagrammatic representation of the decoder 44. The 10-bit parallel data produced by the deserializer is seen to be received over bit lines RX[9:0] by a decoder switch 150. The decoder switch 150 serves to switch the 10-bit data received over bit lines RX[9:0] to switched bit lines S[9:0] in accordance with frame boundary pointer value 118 provided by the synchronization module 114. Specifically, the one of the received bits RX[9:0] corresponding to the first transmitted bit T[0] is switched to bit line S[0], the one of the received bits RX[9:0] corresponding to the second transmitted bit T[1] is switch to bit line S[1], and so on. The switched data impressed upon bit lines S[7:0], which corresponds to the transmitted data byte T[7:0], is stored within 8-bit latch 154. Similarly, the switched data bit S[8], which corresponds to the transmitted bit T[8], is provided to 1-bit latch 158. Since the logical value of bit line S[8] tracks the logical value of T[8], the bit line S[8] informs the Alternate Bit Inversion (ABI) decoder 160 as to whether the even bits of the input data D[7:0] were complemented by CABI logic 90 (FIG. 7) during the encoding process. Likewise, the bit line S[9] (which tracks the logical value of T[9]) informs the ABI decoder 160 as to whether CTBI logic 100 complemented the byte stored within latch 104 during the DC-balancing portion of the encoding process. In this way the decoder 160 is informed of the logical operations performed upon the byte S[7:0] stored within 8-bit latch 154 during the encoding process, thereby facilitating straightforward decoding using random logic.

Figure 9:
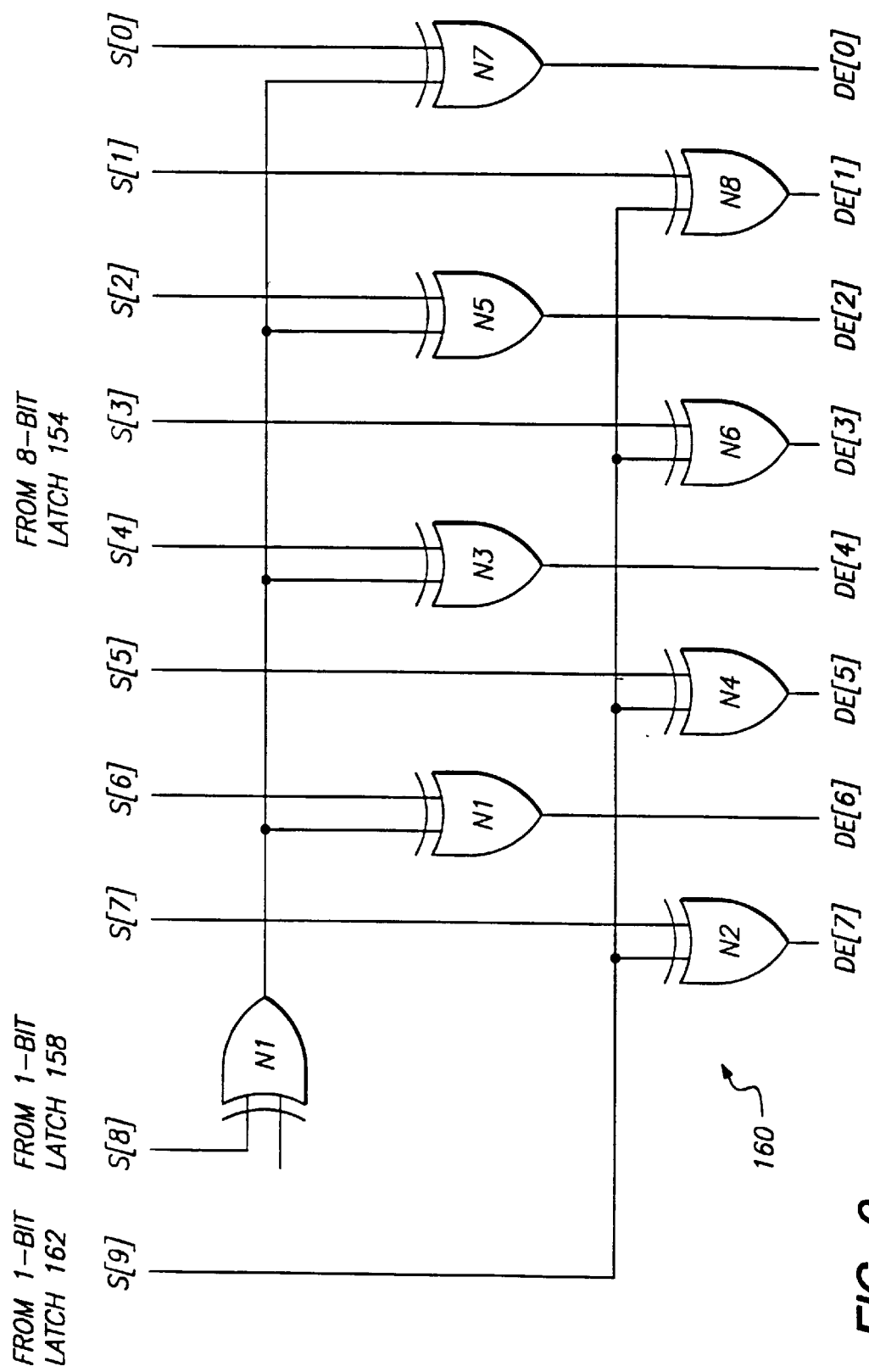
FIG. 9 shows a random logic implementation of an alternate byte inversion decoder module of the decoder of FIG. 8.

Turning now to FIG. 9, there is shown a random logic implementation of the ABI decoder 160. The ABI decoder includes a set of nine exclusive-or (XOR) gates N1-N9 for decoding the 10-bit frame-aligned data S[9:0] in order to produce the 8-bit decoded byte DE[7:0]. In the implementation of FIG. 9, the XOR gates N1-N9 produce the decoded byte DE[7:0] as follows:

DE[7]:=S[7] xor S[9]
DE[6]:=S[6] xor β
DE[5]:=S[5] xor S[9]
DE[4]:=S[4] xor β
DE[3]:=S[3] xor S[9]
DE[2]:=S[2] xor β
DE[1]:=S[1] xor S[9]
DE[0]:=S[0] xor β
where β:=S[9] xor S[8].

V. Synchronization

As mentioned above, the decoder synchronization module 114 provides an indication to the decoder 44 of the frame boundary of each transmitted 10-bit character T[9:0]. The decoder module 114, together with the decoder switch 150 (FIG. 8), effectively function as a barrel-shifter to shuffle the parallel data RX[9:0] from the deserializer into the frame-aligned data S[9:0]. In accordance with the invention, a preamble sequence is produced by the encoder 18 at various times (e.g., at system power-up) in order to facilitate frame boundary detection by the synchronization module 114. In the exemplary embodiment this preamble sequence includes several repetitions of selected out-of-band characters easily distinguishable from in-band characters. Again, during high-transition mode operation each out-of-band character will include less than four logical transitions, and during low-transition mode operation each out-of-band character will includes four or more logical transitions. As is discussed below, during operation in each mode several repetitions of specially selected out-of-band characters are produced by the encoder 18 during the preambling period as a means of ensuring rapid frame boundary identification within the decoder synchronization module 114. At the conclusion of the preambling period, the module 114 will "know" which of the bit lines RX[9:0] corresponds to the first bit T[0] of the 10-bit transmitted character, and will inform decoder via frame boundary pointer 118.

By selecting an appropriate subset of out-of-band characters for transmission during the preambling period, the worst-case time required for synchronization to be achieved may be reduced relative to that required by conventional synchronization schemes. In particular, during low-transition mode operation the following out-of-band characters are used as "synchronization characters".

```
1100101010
1101001010
1101010010
1101010100
```

During high-transition mode operation, the following out-of-band characters are used as synchronization characters:

```
1000001111
1000011111
1000111111
1001111111
1011111111
```

During each preambling period, three repetitions of the same synchronization character are produced by the encoder 18. As is described herein, by processing the 21 bits most recently produced by the encoder 14, synchronization module 114 is able to detect at least one of the three repetitions of the synchronization character transmitted during a given preambling period. This advantageously allows synchronization to be achieved within a relatively short preambling period.

Figure 10:
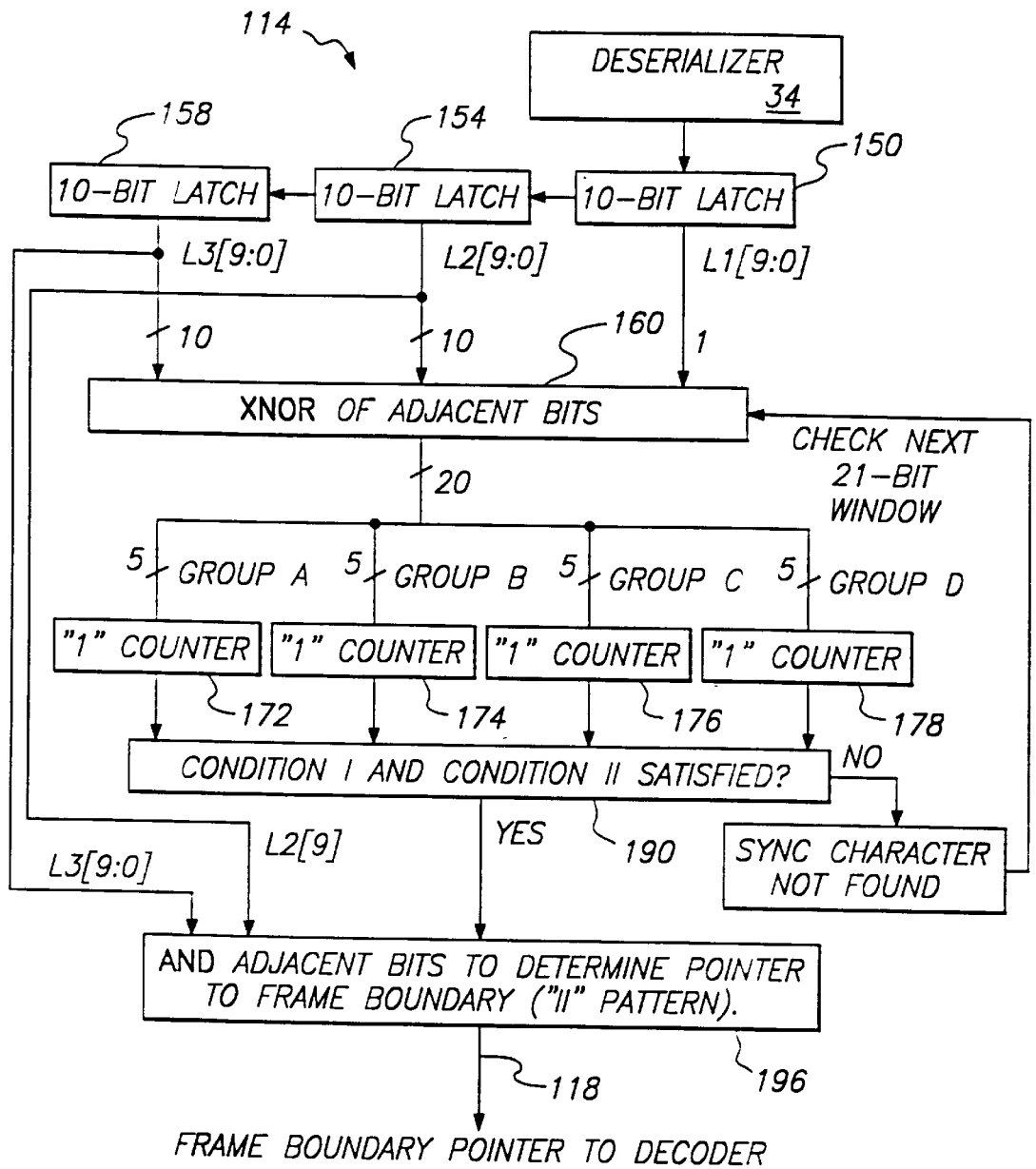
FIG. 10 is a flow chart depicting the synchronization process effected by a decoder synchronization module operative in conjunction with the decoder of FIG. 8.

Turning now to FIG. 10, a flow chart is provided of the synchronization process effected by the decoder synchronization module 114 during low-transition ode operation. During each clock cycle of the module 114, a block of ten bits is loaded from the deserializer 34 into a first 10-bit latch 150. Also during each clock cycle, a 10-bit block is transferred from the first 10-bit latch 150 to a second 10-bit latch 154. Similarly, the 10-bit block currently stored within the second 10-bit latch 154 is transferred during each clock cycle to a third 10-bit latch 158.

As is indicated by FIG. 10, an exclusive-NOR (XNOR) operation (step 162) is performed between adjacent bits included within a 21-bit "window" of data held by the latches 150,154,158. Specifically, this 21-bit window includes a 10-bit block L3[9:0] from the third latch 158, a 10-bit block L2[9:0] from the second latch 154, and the bit L1[9] from the first latch 150. In this regard the bit L1[9] is that bit which becomes bit L2[9] upon being transferred to the second latch 154. As an example of operation during the low-transition mode, consider a 21-bit window (i.e., L3[9:0], L2[9:0], L1[9]) comprised of the following parallel bit sequence:

```
101101001010110100101
```

If an XNOR operation is performed between each pair of adjacent bits, the following result is obtained:

```
00100010000010001000
```

As is indicated by FIG. 10, this 20-bit result of the XNOR operation (step 160) is divided into four 5-bit groups (i.e., Group A, Group B, Group C and Group D). In the current example, these four 5-bit groups are defined as follows:

| | |
|---|---|
| 00100010000010001000 | {Result of XNOR operation} |
| 00100 | {Group A} |

-continued

| | |
|---|---|
| 01000 | {Group B} |
| 00100 | {Group C} |
| 01000 | {Group D} |

The synchronization characters for both the high-transition mode and the low-transition modes enumerated above have been selected such that particular relationships arise between Groups A, B, C and D during the preambling period. That is, when three consecutive occurrences of the same synchronization character— produced by the encoder 18 during preambling—are received by the deserializer 34 and provide as 10-bit parallel data to the synchronization module 114.

In an exemplary implementation, the following two relationships (Condition I and Condition II) arise between Groups A, B, C and D during the preambling period:

Condition I. The number of logical "1's" collectively present in Groups A, B, C, and D is exactly four, and corresponds to one of the following three cases:

| | Number of Logical 1's | | | |
|---|---|---|---|---|
| Case | Group A | Group B | Group C | Group D |
| #1 | 1 | 1 | 1 | 1 |
| #2 | 2 | 0 | 2 | 0 |
| #3 | 0 | 2 | 0 | 2 |

As is indicated by FIG. 10, the number of "1's" in each of the Groups A, B, C and D are determined by "1" counter modules 172, 174, 176 and 178, respectively. Since the number of "1's" within each Group A, B, C and D is determined by the results of the XNOR operation between adjacent bits in the 21-bit window (step 160), the number of "1's" within each group is indicative of the number of "non-transitions" in logical value between adjacent bits in each of four segments of the 21-bit window associated with Groups A, B, C and D. In the current example, it is seen that each of Groups A, B, C and D each include a single "1". Accordingly, the current example corresponds to Case #1.

Condition II. The sequence of bits comprising Group A is equivalent to the bit sequence of Group C, and the sequence of bits comprising Group B is equivalent to the bit sequence of Group D. That is, Group A=Group C, and Group B=Group D.

In accordance with the invention, both Condition I AND Condition II are satisfied if and only if the same synchronization character is stored within the first, second and third 10-bit latches 150, 154 and 158. That is, both Condition I and Condition II are satisfied only during the preambling period, when three repetitions of the same synchronization character are produced by the encoder 18. This aspect of the invention is explained immediately below with reference to low-transition mode operation.

As was described above, the adjacent bits within a 21-bit window provided by latches 150, 154 and 158 are XNOR'ed during step 160 (FIG. 10). Because each in-band or out-of-band character produced by the encoder 18 is exactly ten bits in length, the 21-bit window will include all or part of $1^{st}$, $2^{nd}$ and $3^{rd}$ 10-bit characters. The various ways in which the 21-bit window may include bits from these $1^{st}$, $2^{nd}$ and $3^{rd}$ 10-bit characters is set forth below:

| | # Of Bits | |
|---|---|---|
| 1st Character | 2nd Character | 3rd Character |
| 1 | 10 | 10 |
| 2 | 10 | 9 |
| 3 | 10 | 8 |
| 4 | 10 | 7 |
| 5 | 10 | 6 |
| 6 | 10 | 5 |
| 7 | 10 | 4 |
| 8 | 10 | 3 |
| 9 | 10 | 2 |
| 10 | 10 | 1 |

Since each character is either an in-band (e.g., DATA) character or an out-of-band command or synchronization (i.e., SYNC) character, the following sets forth the possible combinations of DATA and SYNC characters among the $1^{st}$, $2^{nd}$ and $3^{rd}$ 10-bit characters contributing to the 21-bit window:

| Combination | 1st Character | 2nd Character | 3rd Character |
|---|---|---|---|
| A | SYNC | SYNC | SYNC |
| B | SYNC | SYNC | DATA |
| C | SYNC | DATA | DATA |
| D | DATA | DATA | DATA |
| E | DATA | DATA | SYNC |
| F | DATA | SYNC | SYNC |

For example, the 21-bit window could be comprised of two bits of a $1^{st}$ SYNC Character, ten bits of a $2^{nd}$ DATA Character, and nine bits of a $3^{rd}$ DATA Character (i.e., Combination C).

During low-transition mode operation, all in-band (e.g., DATA) characters include a maximum of three logical transitions or, equivalently, more than four "non-transitions" in logical value between the ten adjacent bits of the in-band character. Accordingly, during low-transition mode operation if the $2^{nd}$ character is a DATA character, it will include more than four logical non-transitions. Since Condition I indicates that the number of logical non-transitions within the entire 21-bit window will be exactly four when three identical SYNC characters are present therein, Condition I will not be satisfied when the $2^{nd}$ character is a DATA character since it would include more than four logical non-transitions. Hence, if Condition I is to be satisfied then the 21-bit window cannot be comprised of the character sets specified by Combinations C, D and E (i.e., $2^{nd}$ character is a DATA character).

In accordance with the invention, the synchronization characters listed above have been chosen such that Condition II will be satisfied if the $1^{st}$ and $3^{rd}$ characters transmitted during any preamble period are identical. Hence, Combination B and F do not satisfy Condition II. It follows that only Combination A (i.e., three consecutive SYNC characters) satisfies both conditions I and II.

Referring to FIG. 10, if both Condition I and Condition II are satisfied (step 190) then selected adjacent bits within Groups A and B are AND'ed (step 196) as described below in order to identify the frame boundaries of the SYNC characters detected within the 21-bit window. Since each SYNC character within the 21-bit window is loaded by the deserializer 34 into latch 150, the frame boundary of each SYNC character may be identified in terms of the one of the bit lines R[9:0] from the deserializer 34 upon which the first bit of each such SYNC character is impressed. Once this identification is achieved, the decoder is informed of the identity of this bit line R[9:0] by way of frame boundary pointer 118.

The AND operation of step 196 is performed between all of the adjacent bits in the third latch 158 (i.e., L3[9:0]), as well as between L3[0] and L2[9]. When the result of step 190 has indicated that both Condition I and Condition II are satisfied, the result of the AND operation of step 196 will produce only a single logical one indicative of the value of the frame boundary pointer 118. In the current example, L3[9:0]:={1011010010} and L2[9]:=[1], and thus the result of the AND operation of step 196 is {0010000000}. That is, the third position in the 21-bit window corresponds to the first bit of a synchronization character. Accordingly, in the current example the frame boundary pointer 118 would be set so as to identify the third (RX[7]) of the ten bit lines RX[9:0] as carrying the first bit of each 10-bit character produced by the deserializer 34.

In the exemplary embodiment a preambling sequence (i.e., three repetitions of the same out-of-band SYNC character) is sent upon system power-up as well as during lapses in data transmission over the serial link 30. This allows timing synchronization to be maintained between the encoder 18 and decoder 44 even in the absence of data transmission for extended periods.

Figure 11:
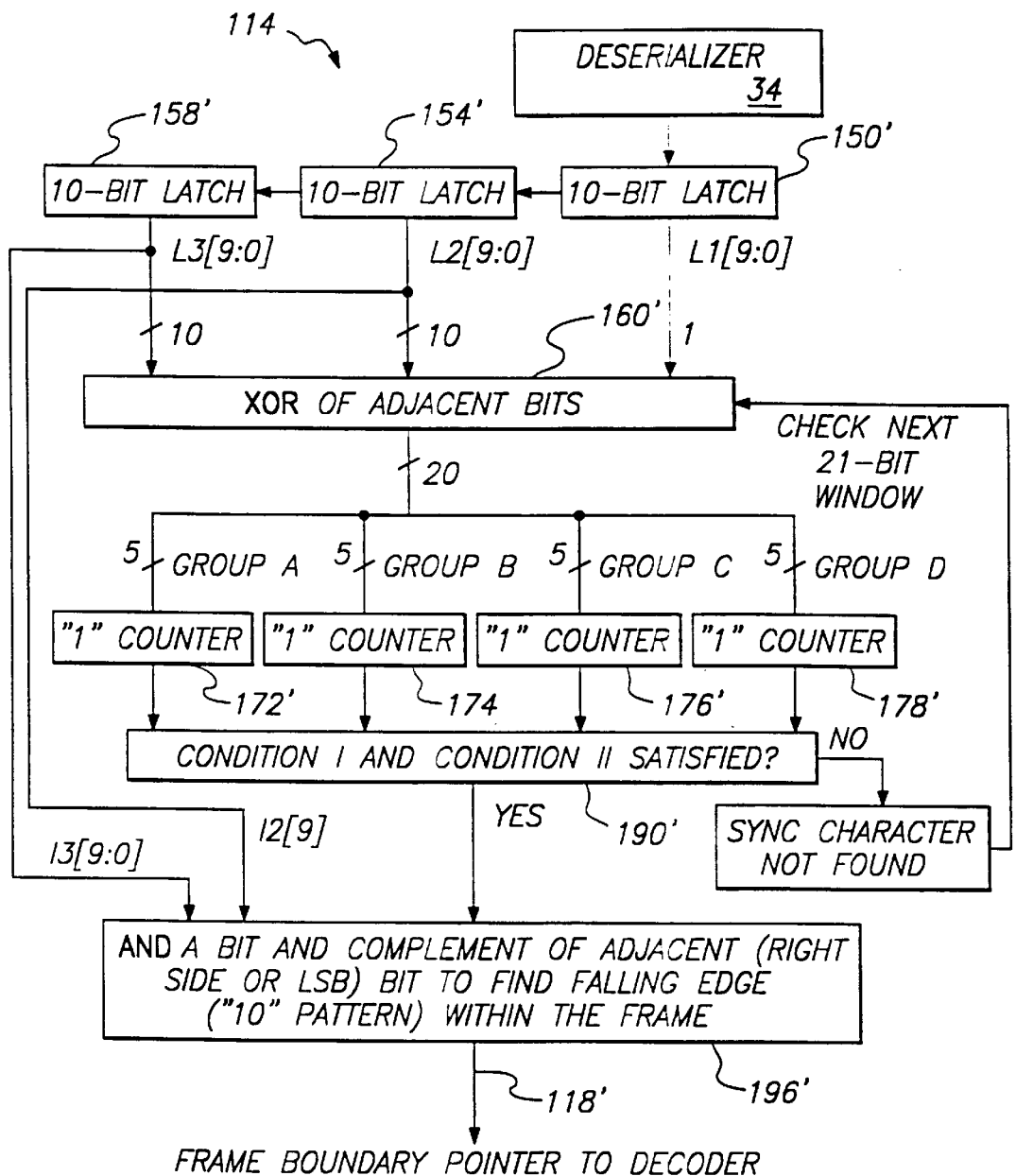
FIG. 11 is a flow chart depicting the synchronization process effected by the decoder synchronization module during high-transition mode operation.

FIG. 11 is a flow chart depicting the synchronization process effected by the decoder synchronization module 114 during high-transition mode operation. As is indicated by FIG. 11, the high-transition mode synchronization process is substantially similar to that performed during low-transition mode operation (FIG. 10). In particular, the high-transition mode synchronization process differs from the low-transition mode synchronization process primarily in that:

(i) In step 160', an exclusive-OR (XOR) rather than an exclusive-NOR (XNOR) operation is performed upon adjacent bits within the latches 150', 154' and 158'.

(ii) In step 196', an AND operation is performed between each bit and the complement of the bit immediately to the right (e.g., L3[9] AND L3[8], L3[8] AND L3[7], L3[7] AND L3[6], and so on. In this way the AND gate producing a logical "1" identifies a "10" or "falling edge" sequence which corresponds to the frame boundary.

VI. Hardware Implementations of Encoder and Decoder Synchronization Module

In this section a description is provided of a specific hardware implementation of the encoder 18, and of an implementation of the decoder synchronization module 114 suitable for use during low-transition mode operation. A description of an exemplary hardware realization of the decoder 44 in random logic was provided above in section III.

FIGS. 7A and 7B provide a schematic representation of an exemplary implementation of the encoder 18. The 8-bit parallel data D[7:0] from latch 70 to be encoded is seen to be provided to seven exclusive-OR gates 240 of the transition counter 74. The outputs of the exclusive-OR gates 240 are provided to a set of full-adders 242, 244, 246 and 248. The carry output (C) of the full-adder 248 corresponds to the COUNT line 78, and indicates whether less than four logical transitions exist between the bits in the data D[7:0]. When an out-of-band command is being received from latch 70, a command line (TX_CMD) provided to NOR gate 260 is raised so as to prevent the COUNT line 78 from causing inversion of the even bits of D[7:0] within CABI logic 90. Otherwise, when the data D[7:0] from latch is being encoded in accordance with the invention, the output 78' of NOR gate 260 tracks the logical value of COUNT line 78.

Figure 12A:
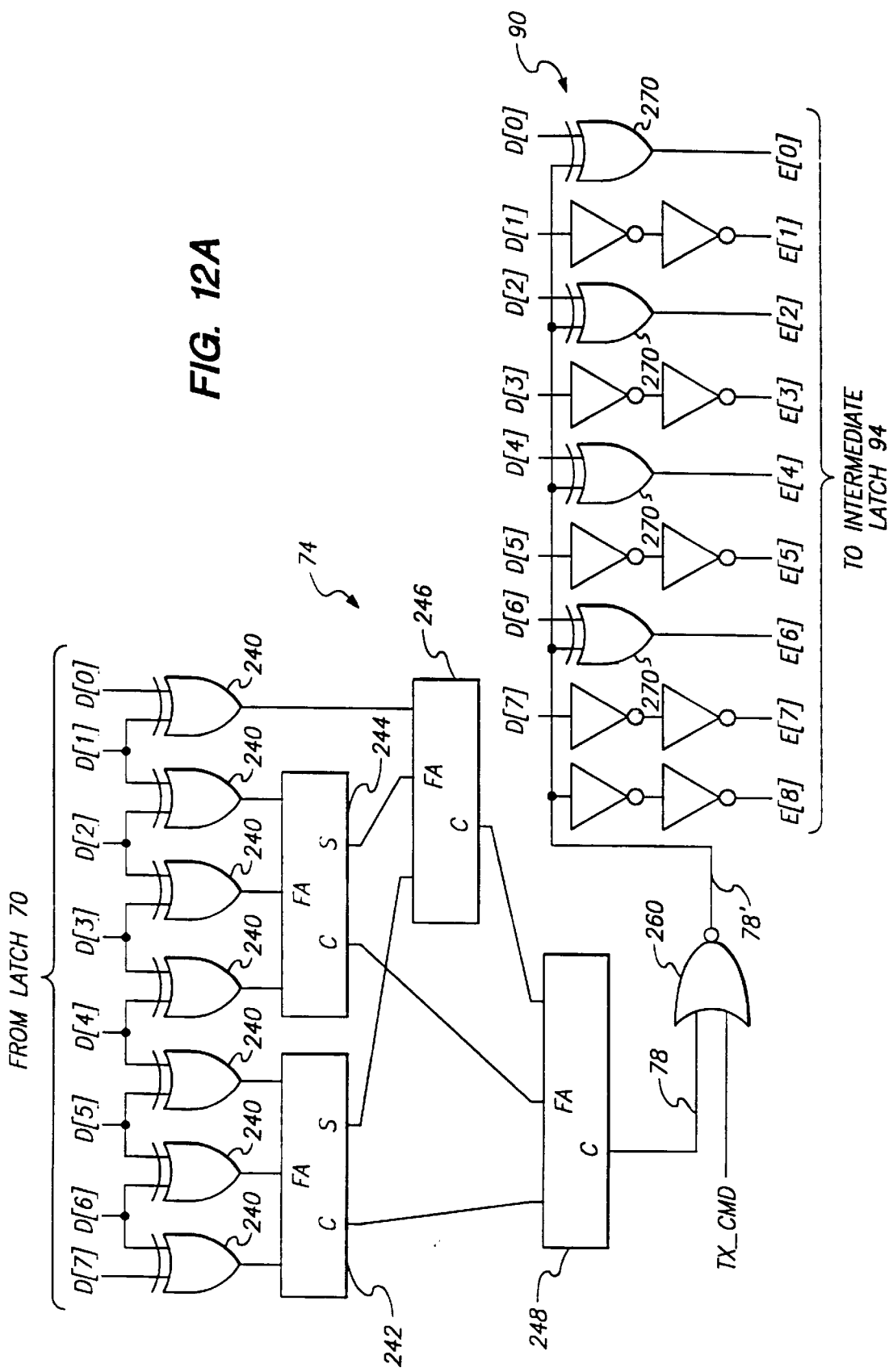

As is indicated by FIG. 12A, in the exemplary embodiment CABI logic 90 is comprised of a plurality of NOR gates 270. Each NOR gate 270 includes one input coupled to COUNT line 78', and another input connected to one of the even bits of D[7:0]. The output of CABI logic 90 is provided to intermediate latch 94, which is coupled to the input of disparity checker 96 (FIG. 12B).

Turning to FIG. 12B, the disparity checker 96 includes four AND gates 290–293 for determining occurrences of "11" within the conditionally bit-inverted byte E[7:0]. Similarly, four NOR gates 296–299 are provided for detecting occurrences of "00" within E[7:0]. Since pattern of "01" and "01" within E[7:0] are already "DC-balanced" in the sense of including equal numbers of ones and zeroes, there exists no need to detect such patterns during the DC-balancing process effected by the circuitry of FIG. 12B. A first full-adder 302 and first half-adder 306 are disposed to count the occurrences of "11" detected by AND gates 290–293. In like manner a second full-adder 308 and second half-adder 312 are provided for counting the occurrences of "00" detected by the NOR gates 296–299. A first pair of full-adders 316 and 318 determine the difference in the counted occurrences of "11" and "00".

The DC-balancing module 98 includes a three-input NOR gate 330, a first exclusive-OR gate 332, a latch 336 and a second exclusive-OR gate 338. When the occurrences of "11" and "00" are determined to be equivalent by full-adders 316 and 318, the complement of E[8] determines the value of T[9], and hence whether the byte E[7:0] is inverted by CTBI logic 100. When the counted occurrences of "00" and "11" are not equivalent, the value of T[9] comprises the output of XOR gate 332. In this regard a first input 342 to XOR gate 332 comprises the most significant bit (MSB) produced by the pair of full-adders 316 and 318, which is equivalent to the MSB of the current disparity $D_{cur}$ (i.e., the difference in "1's and "0's" in E[7:0]). A second input 344 to XOR gate 332 corresponds to the MSB of the cumulative disparity $D_{cum}$. As is indicated by FIG. 12B, the latch 99 for storing the cumulative disparity is comprises of three registers 350–352. The cumulative disparity is updated by a disparity updater 108 comprised of a backward chain of full adders 356 and 358, a set of three exclusive-OR gates 360–362, and a corresponding set of three full-adders 365–367. Finally, CTBI logic 100 includes a set of eight exclusive-OR gates 374.

Figure 13A:
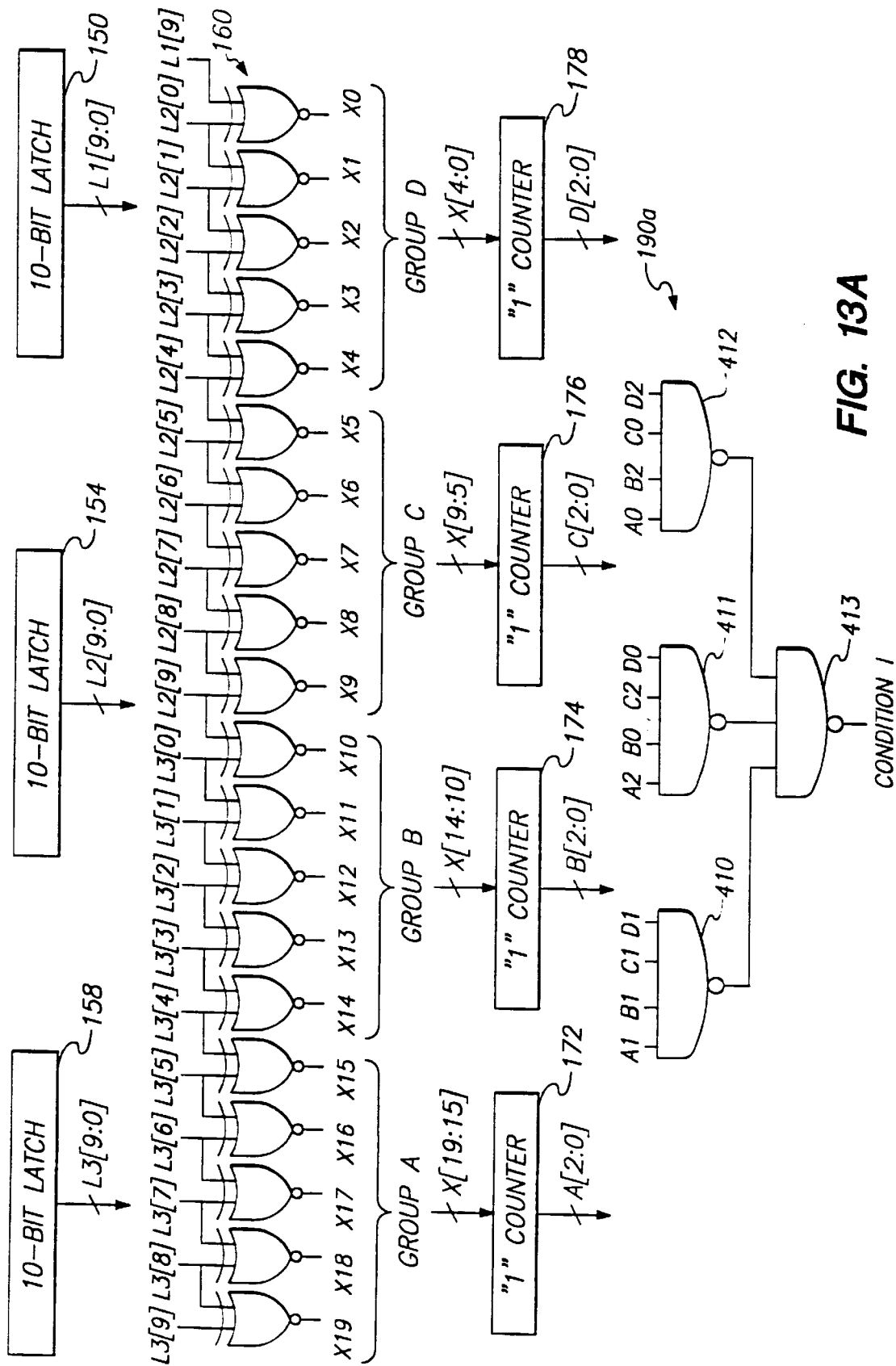
FIGS. 13A and 13B provide a schematic representation of a preferred implementation of the decoder synchronization module.

FIGS. 8A and 8B provide a schematic representation of a preferred implementation of the decoder synchronization module 114. In FIG. 13A, the 10-bit latches 150, 154 and 158, for storing L3[9:0], L2[9:0] and L1[9:0], respectively, may each be realized using an array of ten D-type flip-flops. A plurality of XNOR gates 402 are provided for XNOR'ing adjacent bits included within the 21-bit window corresponding to L3[9:0], L2[9:0] and 11[9]. The Group A, Group B, Group C, and Group D outputs of the XNOR gates 402 are then respectively provided to the "1" counters 172, 174, 176 and 178. As is indicated by FIG. 13A, the existence of Condition I is detected by random logic 190a, which is comprised of four NAND gates 410–413.

Figure 13B:
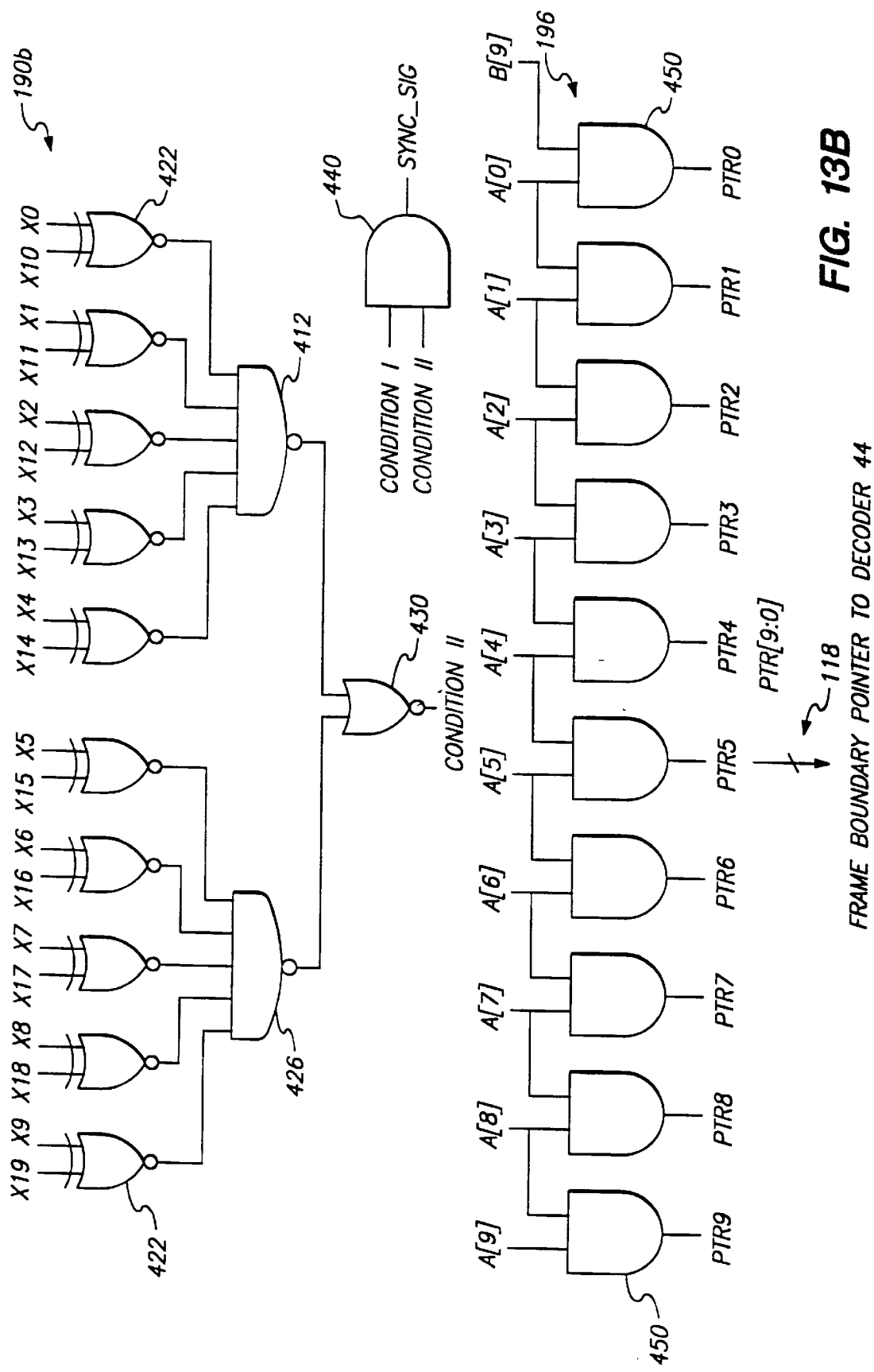

Turning now to FIG. 13B, the existence of Condition II is identified by an arrangement of random logic identified by reference numeral 190b. Random logic 190b includes a set of ten XOR gates 422, the outputs of which are provided as shown to NAND gates 426 and 428. The outputs of NAND gates 426 and 428 are coupled to the inputs of a NOR gate 430, the output of which is driven to a logical "1" when Condition II is satisfied. Finally, the logical state of the output (Sync_Sig) of an AND gate 440 is indicative as to whether Condition I and Condition II have been satisfied (i.e., as to whether synchronization has been achieved). If so, adjacent bits within L3[9:0] and L2[9] are AND'ed (step 196 of FIG. 10) by a set of ten AND gates 450. The outputs PTR[9:0] comprise the frame boundary pointer 118, which informs decoder 44 as to which of the bit lines RX[9:0] correspond to the first bit T[0] of each transmitted 10-bit character T[9:0].

New Coder Mapping - high Transition Control Mode
ASCII, Tr => New-Code, Tr

| | |
|---|---|
| 00000000, 0 => 101010101, 7 | 00110011, 3 => 101100110, 4 |
| 00000001, 1 => 101010100, 6 | 00110100, 4 => 000110100, 4 |
| 00000010, 2 => 101010111, 5 | 00110101, 5 => 000110101, 5 |
| 00000011, 1 => 101010110, 6 | 00110110, 4 => 000110110, 4 |
| 00000100, 2 => 101010001, 5 | 00110111, 3 => 101100010, 4 |
| 00000101, 3 => 101010000, 4 | 00111000, 2 => 101101101, 5 |
| 00000110, 2 => 101010011, 5 | 00111001, 3 => 101101100, 4 |
| 00000111, 1 => 101010010, 6 | 00111010, 4 => 000111010, 4 |
| 00001000, 2 => 101011101, 5 | 00111011, 3 => 101101110, 4 |
| 00001001, 3 => 101011100, 4 | 00111100, 2 => 101101001, 5 |
| 00001010, 4 => 000001010, 4 | 00111101, 3 => 101101000, 4 |
| 00001011, 3 => 101011110, 4 | 00111110, 2 => 101101011, 5 |
| 00001100, 2 => 101011101, 5 | 00111111, 1 => 101101010, 6 |
| 00001101, 3 => 101011000, 4 | 01000000, 2 => 100010101, 5 |
| 00001110, 2 => 101011011, 5 | 01000001, 3 => 100010100, 4 |
| 00001111, 1 => 101011010, 6 | 01000010, 4 => 001000010, 4 |
| 00010000, 2 => 101000101, 5 | 01000011, 3 => 100010110, 4 |
| 00010001, 3 => 101000100, 4 | 01000100, 4 => 001000100, 4 |
| 00010010, 4 => 000010010, 4 | 01000101, 5 => 001000101, 5 |
| 00010011, 3 => 101000110, 4 | 01000110, 4 => 001000110, 4 |
| 00010100, 4 => 000010100, 4 | 01000111, 3 => 100010010, 4 |
| 00010101, 5 => 000010101, 5 | 01001000, 4 => 001001000, 4 |
| 00010110, 4 => 000010110, 4 | 01001001, 5 => 001001001, 5 |
| 00010111, 3 => 101000010, 4 | 01001010, 6 => 001001010, 6 |
| 00011000, 2 => 101001101, 5 | 01001011, 5 => 001001011, 5 |
| 00011001, 3 => 101001100, 4 | 01001100, 4 => 001001100, 4 |
| 00011010, 4 => 000011010, 4 | 01001101, 5 => 001001101, 5 |
| 00011011, 3 => 101001110, 4 | 01001110, 4 => 001001110, 4 |
| 00011100, 2 => 101001001, 5 | 01001111, 3 => 100011010, 4 |
| 00011101, 3 => 101001000, 4 | 01010000, 4 => 001010000, 4 |
| 00011110, 2 => 101001011, 5 | 01010001, 5 => 001010001, 5 |
| 00011111, 1 => 101001010, 6 | 01010010, 6 => 001010010, 6 |
| 00100000, 2 => 101110101, 5 | 01010011, 5 => 001010011, 5 |
| 00100001, 3 => 101110100, 4 | 01010100, 6 => 001010100, 6 |
| 00100010, 4 => 000100010, 4 | 01010101, 7 => 001010101, 7 |
| 00100011, 3 => 101110110, 4 | 01010110, 6 => 001010110, 6 |
| 00100100, 4 => 000100100, 4 | 01010111, 5 => 001010111, 5 |
| 00100101, 5 => 000100101, 5 | 01011000, 4 => 001011000, 4 |
| 00100110, 4 => 000100110, 4 | 01011001, 5 => 001011001, 5 |
| 00100111, 3 => 101110010, 4 | 01011010, 6 => 001011010, 6 |
| 00101000, 4 => 000101000, 4 | 01011011, 5 => 001011011, 5 |
| 00101001, 5 => 000101001, 5 | 01011100, 4 => 001011100, 4 |
| 00101010, 6 => 000101010, 6 | 01011101, 5 => 001011101, 5 |
| 00101011, 5 => 000101011, 5 | 01011110, 4 => 001011110, 4 |
| 00101100, 4 => 000101100, 4 | 01011111, 3 => 100001010, 4 |
| 00101101, 5 => 000101101, 5 | 01100000, 2 => 100110101, 5 |
| 00101110, 4 => 000101110, 4 | 01100001, 3 => 100110100, 4 |
| 00101111, 3 => 101111010, 4 | 01100010, 4 => 001100010, 4 |
| 00110000, 2 => 101100101, 5 | 01100011, 3 => 100110110, 4 |
| 00110001, 3 => 101100100, 4 | 01100100, 4 => 001100100, 4 |
| 00110010, 4 => 000110010, 4 | 01100101, 5 => 001100101, 5 |
| 01101011, 5 => 001101011, 5 | 01100110, 4 => 001100110, 4 |
| 01101100, 4 => 001101100, 4 | 01100111, 3 => 100110010, 4 |
| 01101101, 5 => 001101101, 5 | 01101000, 4 => 001101000, 4 |
| 01101110, 4 => 001101110, 4 | 01101001, 5 => 001101001, 5 |
| 01101111, 3 => 100111010, 4 | 01101010, 6 => 001101010, 6 |
| 01110000, 2 => 100100101, 5 | 10100011, 4 => 010100011, 4 |
| 01110001, 3 => 100100100, 4 | 10100100, 5 => 010100100, 5 |
| 01110010, 4 => 001110010, 4 | 10100101, 6 => 010100101, 6 |
| 01110011, 3 => 100100110, 4 | 10100110, 5 => 010100110, 5 |
| 01110100, 4 => 001110100, 4 | 10100111, 4 => 010100111, 4 |
| 01110101, 5 => 001110101, 5 | 10101000, 5 => 010101000, 5 |
| 01110110, 4 => 001110110, 4 | 10101001, 6 => 010101001, 6 |
| 01110111, 3 => 100100010, 4 | 10101010, 7 => 010101010, 7 |

| | |
|---|---|
| 01111000, 2 => 100101101, 5 | 10101011, 6 => 010101011, 6 |
| 01111001, 3 => 100101100, 4 | 10101100, 5 => 010101100, 5 |
| 01111010, 4 => 001111010, 5 | 10101101, 6 => 010101101, 6 |
| 01111011, 3 => 100101110, 4 | 10101110, 5 => 010101110, 5 |
| 01111100, 2 => 100101001, 5 | 10101111, 4 => 010101111, 4 |
| 01111101, 3 => 100101000, 4 | 10110000, 3 => 111110101, 4 |
| 01111110, 2 => 100101011, 5 | 10110001, 4 => 010110001, 4 |
| 01111111, 1 => 100101010, 6 | 10110010, 5 => 010110010, 5 |
| 10000000, 1 => 111010101, 6 | 10110011, 4 => 010110011, 4 |
| 10000001, 2 => 111010100, 5 | 10110100, 5 => 010110100, 5 |
| 10000010, 3 => 111010111, 4 | 10110101, 6 => 010110101, 6 |
| 10000011, 2 => 111010110, 5 | 10110110, 5 => 010110110, 5 |
| 10000100, 3 => 111010001, 4 | 10110111, 4 => 010110111, 4 |
| 10000101, 4 => 010000101, 4 | 10111000, 3 => 111101101, 4 |
| 10000110, 3 => 111010011, 4 | 10111001, 4 => 010111001, 4 |
| 10000111, 2 => 111010010, 5 | 10111010, 5 => 010111010, 5 |
| 10001000, 3 => 111011101, 4 | 10111011, 4 => 010111011, 4 |
| 10001001, 4 => 010001001, 4 | 10111100, 3 => 111101001, 4 |
| 10001010, 5 => 010001010, 5 | 10111101, 4 => 010111101, 4 |
| 10001011, 4 => 010001011, 4 | 10111110, 3 => 111101011, 4 |
| 10001100, 3 => 111011001, 4 | 10111111, 2 => 111101010, 5 |
| 10001101, 4 => 010001101, 4 | 11000000, 1 => 110010101, 6 |
| 10001110, 3 => 111011011, 4 | 11000001, 2 => 110010100, 5 |
| 10001111, 2 => 111011010, 5 | 11000010, 3 => 110010111, 4 |
| 10010000, 3 => 111000101, 4 | 11000011, 2 => 110010110, 5 |
| 10010001, 4 => 010010001, 4 | 11000100, 3 => 110010001, 4 |
| 10010010, 5 => 010010010, 5 | 11000101, 4 => 011000101, 4 |
| 10010011, 4 => 010010011, 4 | 11000110, 3 => 110010011, 4 |
| 10010100, 5 => 010010100, 5 | 11000111, 2 => 110010010, 5 |
| 10010101, 6 => 010010101, 6 | 11001000, 3 => 110011101, 4 |
| 10010110, 5 => 010010110, 5 | 11001001, 4 => 011001001, 4 |
| 10010111, 4 => 010010111, 4 | 11001010, 5 => 011001010, 5 |
| 10011000, 3 => 111001101, 4 | 11001011, 4 => 011001011, 4 |
| 10011001, 4 => 010011001, 4 | 11001100, 3 => 110011001, 4 |
| 10011010, 5 => 010011010, 5 | 11001101, 4 => 011001101, 4 |
| 10011011, 4 => 010011011, 4 | 11001110, 3 => 110011011, 4 |
| 10011100, 3 => 111001001, 4 | 11001111, 2 => 110011010, 5 |
| 10011101, 4 => 010011101, 4 | 11010000, 3 => 110000101, 4 |
| 10011110, 3 => 111001011, 4 | 11010001, 4 => 011010001, 4 |
| 10011111, 2 => 111001010, 5 | 11010010, 5 => 011010010, 5 |
| 10100000, 3 => 111110101, 4 | 11010011, 4 => 011010011, 4 |
| 10100001, 4 => 010100001, 4 | 11010100, 5 => 011010100, 5 |
| 10100010, 5 => 010100010, 5 | 11010101, 6 => 011010101, 6 |
| 11011011, 4 => 011011011, 4 | 11010110, 5 => 011010110, 5 |
| 11011100, 3 => 110001101, 4 | 11010111, 4 => 011010111, 4 |
| 11011101, 4 => 011011101, 4 | 11011000, 3 => 110001101, 4 |
| 11011110, 3 => 110001011, 4 | 11011001, 4 => 011011001, 4 |
| 11011111, 2 => 110001010, 5 | 11011010, 5 => 011011010, 5 |
| 11100000, 1 => 110110101, 6 | |
| 11100001, 2 => 110110100, 5 | |
| 11100010, 3 => 110110111, 4 | |
| 11100011, 2 => 110110110, 5 | |
| 11100100, 3 => 110110001, 4 | |
| 11100101, 4 => 011100101, 4 | |
| 11100110, 3 => 110110011, 4 | |
| 11100111, 2 => 110110010, 5 | |
| 11101000, 3 => 110111101, 4 | |
| 11101001, 4 => 011101001, 4 | |
| 11101010, 5 => 011101010, 5 | |
| 11101011, 4 => 011101011, 4 | |
| 11101100, 3 => 110111001, 4 | |
| 11101101, 4 => 011101101, 4 | |
| 11101110, 3 => 110111011, 4 | |
| 11101111, 2 => 110111010, 5 | |
| 11110000, 1 => 110100101, 6 | |
| 11110001, 2 => 110100100, 5 | |
| 11110010, 3 => 110100111, 4 | |
| 11110011, 2 => 110100110, 5 | |
| 11110100, 3 => 110100001, 4 | |
| 11110101, 4 => 011110101, 4 | |
| 11110110, 3 => 110100011, 4 | |
| 11110111, 2 => 110100010, 5 | |
| 11111000, 1 => 110101101, 6 | |
| 11111001, 2 => 110101100, 5 | |
| 11111010, 3 => 110101111, 4 | |
| 11111011, 2 => 110101110, 5 | |
| 11111100, 1 => 110101001, 6 | |
| 11111101, 2 => 110101000, 5 | |
| 11111110, 0 => 110101010, 7 | |

Total Tr: 1176

Mean Tr: 4.59

New Coder Mapping - Low Transition
Control Mode
ASCII, Tr => New-Code, Tr

| | |
|---|---|
| 00000000, 0 => 000000000, 0 | 00110011, 3 => 000110011, 3 |
| 00000001, 1 => 000000001, 1 | 00110100, 4 => 101100001, 3 |
| 00000010, 2 => 000000010, 2 | 00110101, 5 => 101100000, 2 |
| 00000011, 1 => 000000011, 1 | 00110110, 4 => 101100011, 3 |
| 00000100, 2 => 000000100, 2 | 00110111, 3 => 000110111, 3 |
| 00000101, 3 => 000000101, 3 | 00111000, 2 => 000111000, 2 |
| 00000110, 2 => 000000110, 2 | 00111001, 3 => 000111001, 3 |
| 00000111, 1 => 000000111, 1 | 00111010, 4 => 101101111, 3 |
| 00001000, 2 => 000001000, 2 | 00111011, 3 => 000111011, 3 |
| 00001001, 3 => 000001001, 3 | 00111100, 2 => 000111100, 2 |
| 00001010, 4 => 101011111, 3 | 00111101, 3 => 000111101, 3 |
| 00001011, 3 => 000001011, 3 | 00111110, 2 => 000111110, 2 |
| 00001100, 2 => 000001100, 2 | 00111111, 1 => 000111111, 1 |
| 00001101, 3 => 000001101, 3 | 01000000, 2 => 001000000, 2 |
| 00001110, 2 => 000001110, 2 | 01000001, 3 => 001000091, 3 |
| 00001111, 1 => 000001111, 1 | 01000010, 4 => 100010111, 3 |
| 00010000, 2 => 000010000, 2 | 01000011, 3 => 001000011, 3 |
| 00010001, 3 => 100010001, 3 | 01000100, 4 => 100010001, 3 |
| 00010010, 4 => 101000111, 3 | 01000101, 5 => 100010000, 2 |
| 00010011, 3 => 000010011, 3 | 01000110, 4 => 100010011, 3 |
| 00010100, 4 => 101000001, 3 | 01000111, 3 => 001000111, 3 |
| 00010101, 5 => 101000000, 2 | 01001000, 4 => 100011101, 3 |
| 00010110, 4 => 101000011, 3 | 01001001, 5 => 100011100, 2 |
| 00010111, 3 => 000010111, 3 | 01001010, 6 => 100011111, 1 |
| 00011000, 2 => 000011000, 2 | 01001011, 5 => 100011110, 2 |
| 00011001, 3 => 000011001, 3 | 01001100, 4 => 100011001, 3 |
| 00011010, 4 => 101001111, 3 | 01001101, 5 => 100011000, 2 |
| 00011011, 3 => 000011011, 3 | 01001110, 4 => 100011011, 3 |
| 00011100, 2 => 000011100, 2 | 01001111, 3 => 001001111, 3 |
| 00011101, 3 => 000011101, 3 | 01010000, 4 => 100000101, 3 |
| 00011110, 2 => 000011110, 2 | 01010001, 5 => 100000100, 2 |
| 00011111, 1 => 000011111, 1 | 01010010, 6 => 100000111, 1 |
| 00100000, 2 => 000100000, 2 | 01010011, 5 => 100000110, 2 |
| 00100001, 3 => 000100001, 3 | 01010100, 6 => 100000001, 1 |
| 00100010, 4 => 101110111, 3 | 01010101, 7 => 100000000, 0 |
| 00100011, 3 => 000100011, 3 | 01010110, 6 => 100000011, 1 |
| 00100100, 4 => 101110001, 3 | 01010111, 5 => 100000010, 2 |
| 00100101, 5 => 101110000, 2 | 01011000, 4 => 100001101, 3 |
| 00100110, 4 => 101110011, 3 | 01011001, 5 => 100001100, 2 |
| 00100111, 3 => 000100111, 3 | 01011010, 6 => 100001111, 1 |
| 00101000, 4 => 101111101, 3 | 01011011, 5 => 100001110, 2 |
| 00101001, 5 => 101111100, 2 | 01011100, 4 => 100001001, 3 |
| 00101010, 6 => 101111111, 1 | 01011101, 5 => 100001000, 2 |
| 00101011, 5 => 101111110, 2 | 01011110, 4 => 100001011, 3 |
| 00101100, 4 => 101111001, 3 | 01011111, 3 => 001011111, 3 |
| 00101101, 5 => 101111000, 2 | 01100000, 2 => 001100000, 2 |
| 00101110, 4 => 101111011, 3 | 01100001, 3 => 001100001, 3 |
| 00101111, 3 => 000101111, 3 | 01100010, 4 => 100110111, 3 |
| 00110000, 2 => 000110000, 2 | 01100011, 3 => 001100011, 3 |
| 00110001, 3 => 000110001, 3 | 01100100, 4 => 100110001, 3 |
| 00110010, 4 => 101100111, 3 | 01100101, 5 => 100110000, 2 |
| 01101011, 5 => 100111110, 2 | 01100110, 4 => 100110011, 3 |
| 01101100, 4 => 100111001, 3 | 01100111, 3 => 001100111, 3 |
| 01101101, 5 => 100111000, 2 | 01101000, 4 => 100111101, 3 |
| 01101110, 4 => 100111011, 3 | 01101001, 5 => 100111100, 2 |
| 01101111, 3 => 100111010, 3 | 01101010, 6 => 100111111, 1 |
| 01110000, 2 => 001101111, 2 | |
| 01110001, 3 => 001110000, 3 | 10100011, 4 => 111110110, 3 |
| 01110010, 4 => 001110001, 3 | 10100100, 5 => 111110001, 2 |
| 01110011, 3 => 100100111, 3 | 10100101, 6 => 111110000, 1 |
| 01110100, 4 => 001110011, 3 | 10100110, 5 => 111110011, 2 |
| 01110101, 5 => 100100001, 2 | 10100111, 4 => 111110010, 3 |
| 01110110, 4 => 100100000, 3 | 10101000, 5 => 111111101, 2 |
| 01110111, 3 => 100100011, 3 | 10101001, 6 => 111111100, 1 |
| 01111000, 2 => 001111000, 2 | 10101010, 7 => 111111111, 0 |
| 01111001, 3 => 001111001, 3 | 10101011, 6 => 111111110, 1 |
| 01111010, 4 => 100101111, 3 | 10101100, 5 => 111111001, 2 |
| 01111011, 3 => 001111011, 3 | 10101101, 6 => 111111000, 1 |
| 01111100, 2 => 001111100, 2 | 10101110, 5 => 111111011, 2 |
| 01111101, 3 => 011111101, 3 | 10101111, 4 => 111111010, 3 |
| 01111110, 2 => 001111110, 2 | 10110000, 3 => 010110000, 3 |
| 01111111, 1 => 001111111, 1 | 10110001, 4 => 111100100, 3 |
| 10000000, 1 => 010000000, 1 | 10110010, 5 => 111100111, 2 |
| 10000001, 2 => 010000001, 2 | 10110011, 4 => 111100110, 3 |
| | 10110100, 5 => 111100001, 2 |

-continued

```
10000010, 3 => 010000010, 3      10110101, 6 => 111100000, 1
10000011, 2 => 010000011, 2      10110110, 5 => 111100011, 2
10000100, 3 => 010000100, 3      10110111, 4 => 111100010, 3
10000101, 4 => 111010000, 3      10111000, 3 => 010111000, 3
10000110, 3 => 010000110, 3      10111001, 4 => 111101100, 3
10000111, 2 => 010000111, 2      10111010, 5 => 111101111, 2
10001000, 3 => 010001000, 3      10111011, 4 => 111101110, 3
10001001, 4 => 111011100, 3      10111100, 3 => 010111100, 3
10001010, 5 => 111011111, 2      10111101, 4 => 111101000, 3
10001011, 4 => 110111110, 3      10111110, 3 => 010111110, 3
10001100, 3 => 010001100, 3      10111111, 2 => 010111111, 2
10001101, 4 => 111011000, 3      11000000, 1 => 011000000, 1
10001110, 3 => 010001110, 3      11000001, 2 => 011000001, 2
10001111, 2 => 010001111, 2      11000010, 3 => 011000010, 3
10010000, 3 => 010010000, 3      11000011, 2 => 011000011, 2
10010001, 4 => 111000100, 3      11000100, 3 => 011000100, 3
10010010, 5 => 111000111, 2      11000101, 4 => 110010000, 3
10010011, 4 => 111000110, 3      11000110, 3 => 011000110, 3
10010100, 5 => 111000001, 2      11000111, 2 => 011000111, 2
10010101, 6 => 111000000, 1      11001000, 3 => 011001000, 3
10010110, 5 => 111000011, 2      11001001, 4 => 110011100, 3
10010111, 4 => 111000010, 3      11001010, 5 => 110011111, 2
10011000, 3 => 010011000, 3      11001011, 4 => 110011110, 3
10011001, 4 => 111001100, 3      11001100, 3 => 011001100, 3
10011010, 5 => 111001111, 2      11001101, 4 => 110011000, 3
10011011, 4 => 111001110, 3      11001110, 3 => 011001110, 3
10011100, 3 => 010011100, 3      11001111, 2 => 011001111, 2
10011101, 4 => 111001000, 3      11010000, 3 => 011010000, 3
10011110, 3 => 010011110, 3      11010001, 4 => 110000100, 3
10011111, 2 => 010011111, 2      11010010, 5 => 110000111, 2
10100000, 3 => 010100000, 3      11010011, 4 => 110000110, 3
10100001, 4 => 111110100, 3      11010100, 5 => 110000001, 2
10100010, 5 => 111110111, 2      11010101, 6 => 110000000, 1
11011011, 4 => 110001110, 3      11010110, 5 => 110000011, 2
11011100, 3 => 011011100, 3      11010111, 4 => 110000010, 3
11011101, 4 => 110001000, 3      11011000, 3 => 011011000, 3
11011110, 3 => 011011110, 3      11011001, 4 => 110001100, 3
11011111, 2 => 011011111, 2      11011010, 5 => 110001111, 2
11100000, 1 => 011100000, 1
11100001, 2 => 011100001, 2
11100010, 3 => 011100010, 3
11100011, 2 => 011100011, 2
11100100, 3 => 011100100, 3
11100101, 4 => 110110000, 3
11100110, 3 => 011100110, 3
11100111, 2 => 011100111, 2
11101000, 3 => 011101000, 3
11101001, 4 => 110111100, 3
11101010, 5 => 110111111, 2
11101011, 4 => 110111110, 3
11101100, 3 => 011101100, 3
11101101, 4 => 110111000, 3
11101110, 3 => 011101110, 3
11101111, 2 => 011101111, 2
11110000, 1 => 011110000, 1
11110001, 2 => 011110001, 2
11110010, 3 => 011110010, 3
11110011, 2 => 011110011, 2
11110100, 3 => 011110100, 3
11110101, 4 => 110100000, 3
11110110, 3 => 011110110, 3
11110111, 2 => 011110111, 2
11111000, 1 => 011111000, 1
11111001, 2 => 011111001, 2
11111010, 3 => 011111010, 3
11111011, 2 => 011111011, 2
11111100, 1 => 011111100, 1
11111101, 2 => 011111101, 2
11111110, 1 => 011111110, 1
11111111, 0 => 011111111, 0
Total Tr: 616
Mean Tr: 2.41
```

The previous description of the preferred embodiments has been provided to enable any person skilled in the art to make or use the present invention. Various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. A method of high speed digital video signal transmission comprising the steps of:

encoding a first sequence of n bit data words into n+m bit data characters and encoding control data into n+m bit control characters where the n and the m are positive integers each of said data characters having a first plurality of logical transitions within a first range and each of said control characters having a second plurality of logical transitions in a second range different from said first range;

generating a serial data stream in response to said data and control characters;

transmitting said serial data stream over a communication link; and separating received ones of said data and control characters received from said communication link on the basis of numbers of logical transitions in said received ones of said data and control characters.

2. In a digital video signal transmission system, a method of high speed data transmission comprising the steps of:

encoding a first sequence of n bit data words into n+m bit data characters and encoding control data into n+m bit control characters where the n and the m are positive integers, each of said data characters having a first plurality of logical transitions within a first range and each of said control characters having a second plurality of logical transitions in a second range different from said first range;

generating a serial data stream in response to said data and control characters; and transmitting said serial data stream over a communication link.

3. The method of claim 2 wherein said step of encoding a first sequence of data words further includes the step of selectively complementing bits in said data words in accordance with the number of logical transitions in each said data word in order to produce selectively complemented data blocks.

4. In a digital video signal transmission system, a method of high speed data transmission comprising the steps of:

encoding a first sequence of data words into data characters and encoding control data into control characters, each of said data characters having a first plurality of logical transitions within a first range and each of said control characters having a second plurality of logical transitions in a second range different from said first range:

generating a serial data stream in response to said data and control characters;

transmitting said serial data stream over a communication link;

wherein said step of encoding a first sequence of data words further includes the step of selectively complementing bits in said data words in accordance with the number of logical transitions in each said data word in order to produce selectively complemented data blocks; and wherein said step of encoding further includes the steps of:

determining a cumulative disparity in the number of logical values of different type included within ones of said selectively complemented data blocks previously encoded into ones of said characters;

determining a current disparity in a candidate character associated with a current one of said selectively complemented data blocks being encoded; and assigning said candidate character to said current one of said selectively complemented data blocks if said current disparity is of a polarity opposite to a first polarity of said cumulative disparity, and assigning the complement of said candidate character to said current one of said selectively complemented data blocks if said current disparity is of said first polarity.

5. A high speed digital video signal transmission system comprising:

encoder means for encoding a first sequence of n bit data words into n+m bit data characters and for encoding control data into n+m bit control characters where the n and the m are positive integers;

serial transmission means, coupled to a first end of a communication link, for transmitting a serial data stream over said communication link in response to said data and control characters; and means, coupled to a second end of said communication link, for distinguishing received ones of said data characters from received ones of said control characters on the basis of numbers of logical transitions in said received ones of said data and control characters.

6. The system of claim 5 wherein said encoder means includes means for encoding each of said data characters having a first plurality of logical transitions within a first range and each of said control characters having a second plurality of logical transitions in a second range.

7. A high speed digital video signal transmission system comprising:

a communication link having a first end and a second end;

a video transmitter coupled to the first end of said communication link;

a video receiver coupled to the second end of said communication link, said video receiver including means for distinguishing data characters received over said communication link from control characters received over said communication link on the basis of the number of logical transitions between bits of said data and control characters where the data characters and the control characters have the same number of bits.

8. The system of claim 7 further including:

video capture means for providing captured video information to said video transmitter, and means for synchronizing timing between said video capture means and said video transmitter.

9. A high speed digital video signal transmission system comprising:

a communication link having a first end and a second end, said communication link including a data line and clock line;

a video transmitter coupled to a first end of said communication link;

a video receiver coupled to a second end of said communication link; and video capture means operatively coupled to said clock line.

10. A video transmitter comprising:

data capture logic adapted to receive a plurality of input data signals and input control signals, each input signal received on a separate input line, for generating at least two subsets of the received input signals; and a plurality of signal transmission paths, at least one signal transmission path corresponding to each subset of input signals, each signal transmission path comprising:

an encoder coupled to receive the corresponding subset of input signals from the data capture logic, for producing a DC balanced sequence of characters from the received subset of input signals; and a serializer coupled to receive the DC balanced sequence of characters from the encoder, for converting the DC balanced sequence of characters into a serial data stream;

wherein the DC balanced sequence of characters comprises data characters and control characters, the data characters having a number of logical transitions falling within a first range and the control characters having a number of logical transitions falling within a second range different from the first range: and each encoder encodes the received data signals into data characters and encodes the received control signals into control characters where the data characters and the control characters have the same number of bits.

11. The transmitter of claim 10 wherein the first and second ranges are selected from among a high-transition range and a low-transition range, the high-transition range being at least a predetermined number, the low-transition range being less than the predetermined number.

12. The transmitter of claim 10 wherein:

the input data signals comprise the red, green, and blue components of a video signal; and the at least two subsets of received input signals comprise a first subset including the red component, a second subset including the green component, and a third subset including the blue component.

13. The transmitter of claim 12 wherein:

the received input control signals comprise six bits, including a horizontal sync and a vertical sync signal of one bit each;

each of the red, green, and blue components comprises eight bits; and each subset of received input signals further includes two bits of the six bits of received input control signals.

14. The transmitter of claim 13 wherein:

each character comprises ten bits, including a DC balanced block of eight bits; and each encoder encodes the eight bits of the red, green, or blue component as a DC balanced block with less than four logical transitions, and encodes the two bits of received input control signals as a DC balanced block with four or more logical transitions.

15. The transmitter of claim 13 wherein:

each character comprises ten bits, including a DC balanced block of eight bits; and each encoder encodes the eight bits of the red, green, or blue component as a DC balanced block with four or more logical transitions; and encodes the two bits of received input control signals as a DC balanced block with less than four logical transitions.

16. The transmitter of claim 12 wherein:

each of the red, green, and blue components comprises a fixed number of bits;

each character includes a DC balanced block with the fixed number of bits; and each encoder encodes the fixed number of bits of the red, green, or blue component as a DC balanced block with less than a predetermined number of logical transitions, and encodes the received input control signals as a DC balanced block with not less than the predetermined number of logical transitions.

17. The transmitter of claim 12 wherein:

each of the red, green, and blue components comprises a fixed number of bits;

each character includes a DC balanced block with the fixed number of bits; and each encoder encodes the fixed number of bits of the red, green, or blue component as a DC balanced block with not less than a predetermined number of logical transitions, and encodes the received input control signals as a DC balanced block with less than the predetermined number of logical transitions.

18. A video transmitter comprising:

data capture logic adapted to receive a plurality of input data signals and input control signals, each input signal received on a separate input line, for generating at least two subsets of the received input signals; and a plurality of signal transmission paths, at least one signal transmission path corresponding to each subset of input signals, each signal transmission path comprising:
    an encoder coupled to receive the corresponding subset of input signals from the data capture logic, for producing a DC balanced sequence of characters from the received subset of input signals; and
a serializer coupled to receive the DC balanced sequence of characters from the encoder, for converting the DC balanced sequence of characters into a serial data stream; and wherein:

each subset of input signals comprises a data block of input data signals, each data block including a plurality of bits;

the DC balanced sequence of characters comprises data characters, each data character including a DC balanced data block; and each encoder encodes the received data blocks into DC balanced data blocks in accordance with a preferred set of data blocks, the preferred set selected from among a high-transition set of data blocks and a low-transition set of data blocks, the high-transition set comprising data blocks with at least a predetermined number of logical transitions, the low-transition set comprising data blocks with less than the predetermined number of logical transitions, the encoder comprising:
    a conditional alternate bit inversion (CABI) circuit for complementing every other bit in the received data block if the received data block is not in the preferred set, and not complementing said bits if the received data block is in the preferred set, to produce a selectively complemented data block; and
    a conditional byte inversion (CTBI) circuit coupled to receive the selectively complemented data block from the CABI circuit, for complementing the selectively complemented data block if a current disparity in the number of logical values of different type included within the selectively complemented data block and a cumulative disparity in the number of logical values of different type included within characters generated for previously received data blocks are of opposite polarities, and not complementing said data block if said disparities are of the same polarity, to produce the DC balanced data block.

19. The transmitter of claim 18 wherein:

the CABI circuit further generates a first bit indicating whether every other bit of the received data block has been complemented;

the CTBI circuit further generates a second bit indicating whether the selectively complemented data block has been complemented; and each data character further includes the first bit and the second bit.

20. The transmitter of claim 10 further comprising a clock transmitter adapted to receive an input clock and coupled to send internal clocks to the encoders, for generating the internal clocks from the input clock.

21. The transmitter of claim 20 wherein a frequency of the internal clocks is an integer multiple of a frequency of the input clock.

22. A video receiver comprising:

at least two signal reception paths, each signal reception path comprising:
    a data recovery module adapted to receive a serial data stream, for converting the serial data stream to a DC balanced sequence of characters, where each of the characters has a same number of bits; and
    a decoder coupled to receive the DC balanced sequence of characters from the data recovery module, for converting the sequence of characters to a set of output signals; and panel interface logic coupled to receive the sets of output signals from the decoders, for combining the sets into a plurality of output data signals and a plurality of output control signals, each output signal transmitted on a separate output line.

23. The receiver of claim 22 wherein:

the DC balanced sequence of characters comprises data characters and control characters, the data characters having a number of logical transitions falling within a first range and the control characters having a number of logical transitions falling within a second range different from the first range; and each decoder converts the received data characters into data signals and converts the received control characters into control signals, the data and control characters separated on the basis of number of logical transitions in said characters.

24. The receiver of claim 23 wherein the first and second ranges are selected from among a high-transition range and a low-transition range, the high-transition range being at least a predetermined number, the low-transition range being less than the predetermined number.

25. The receiver of claim 22 wherein:

the output data signals comprise the red, green, and blue components of a video signal; and the sets of output signals comprise a first set including the red component, a second set including the green component, and a third set including the blue component.

26. The receiver of claim 25 wherein:

the output control signals comprise six bits, including a HSYNC and a VSYNC signal of one bit each;

each of the red, green, and blue components comprises eight bits; and each set of output signals further includes two bits of the six bits of output control signals.

27. The receiver of claim 25 wherein:

each of the red, green, and blue components comprises a fixed number of bits;

each character includes a DC balanced block with the fixed number of bits; and each decoder converts a DC balanced block with less than a predetermined number of logical transitions to a red, green, or blue component, and converts a DC balanced block with not less than the predetermined number of logical transitions to an output control signal.

28. The receiver of claim 25 wherein:

each of the red, green, and blue components comprises a fixed number of bits;

each character includes a DC balanced block with the fixed number of bits; and each decoder converts a DC balanced block with not less than a predetermined number of logical transitions to a red, green, or blue component, and converts a DC balanced block with less than the predetermined number of logical transitions to an output control signal.

29. The receiver of claim 22 wherein:

the DC balanced sequence of characters comprises data characters, each data character comprising a DC balanced data block, each DC balanced data block comprising a selectively complemented data block or its complement, each selectively complemented data block comprising a data block or a data block in which every other bit has been complemented;

each set of output signals comprises the data block, each data block including a plurality of bits; and each decoder converts the received DC balanced data blocks into data blocks.

30. The receiver of claim 29 wherein the data recovery module comprises a synchronization module adapted to receive the serial data stream, for determining the frame boundary pointer based on the received data stream, the frame boundary pointer indicating a location of a character within the data stream.

31. The receiver of claim 30 wherein the synchronization module further comprises:

a plurality of latches adapted to receive the data stream, for storing a portion of the data stream corresponding in length to more than two characters; and combinatorial logic coupled to receive the stored data stream from the latches, for combining the stored data stream to produce the frame boundary pointer.

32. The receiver of claim 29 wherein:

each character further comprises a first bit and a second bit, each first bit indicating whether each selectively complemented data block comprises the data block or the data block in which every other bit has been complemented, and each second bit indicating whether each DC balanced data block comprises the selectively complemented data block or its complement; and the decoder further comprises combinatorial logic for combining the first bit, the second bit, and the DC balanced data block to produce the data block corresponding to the character.

33. The receiver of claim 22 further comprising a clock receiver adapted to receive an external clock and coupled to send internal clocks to the data recovery modules, for generating the internal clocks from the external clock.

34. The receiver of claim 33 wherein a frequency of the internal clocks is an integer multiple of a frequency of the external clock.

35. A high speed digital video system comprising:

data capture logic adapted to receive a plurality of input data signals and input control signals, each input signal received on a separate input line, for generating at least two subsets of the received input signals;

a plurality of signal communications paths, at least one signal communications path corresponding to each subset of input signals, each signal communications path comprising:

an encoder coupled to receive the corresponding subset of input signals from the data capture logic, for producing a DC balanced sequence of characters from the received subset of input signals, where each of the characters has a same number of bits;

a serializer coupled to receive the DC balanced sequence of characters from the encoder, for converting the DC balanced sequence of characters into a serial data stream and transmitting said serial data stream across a communications link;

a data recovery module coupled to receive the serial data stream from the communications link, for converting the serial data stream to a DC balanced sequence of characters; and a decoder coupled to receive the DC balanced sequence of characters from the data recovery module, for converting the sequence of characters to a set of output signals, the set of output signals based on the subset of input signals; and panel interface logic coupled to receive the sets of output signals from the decoders, for combining the sets into a plurality of output data signals and a plurality of output control signals, each output signal transmitted on a separate output line.

36. The system of claim 35 wherein:

the DC balanced sequence of characters comprises data characters and control characters, the data characters having a number of logical transitions falling within a first range and the control characters having a number of logical transitions falling within a second range different from the first range;

each encoder encodes the received data signals into data characters and encodes the received control signals into control characters; and each decoder converts the received data characters into data signals and converts the received control characters into control signals, the data and control characters separated on the basis of number of logical transitions in said characters.

37. The system of claim 35 wherein:

the input data signals comprise the red, green, and blue components of a video signal; and the at least two subsets of received input signals comprise a first subset including the red component, a second subset including the green component, and a third subset including the blue component.

38. A high speed digital video system comprising:

a communications channel having a first end and a second end;

a video transmitter adapted to receive a plurality of input signals and coupled to the first end of the communications channel, for producing a plurality of serial data streams from the plurality of input signals and transmitting said data streams across the communications channel, the plurality of input signals including input data signals and input control signals, each serial data stream including a DC balanced sequence of characters, each sequence of characters including data characters based on the input data signals and control characters based on the input control signals, where the data characters and the control characters both have a same number of bits;

a video receiver coupled to the second end of the communications channel, for receiving the serial data streams and recovering the input signals from the received data streams, the receiver separating received data characters and control characters on the basis of number of logical transitions in said characters.

39. The system of claim 38 further comprising a video capture device coupled to the second end of the communications channel, for capturing video and for transmitting the captured video across the communications channel to the video transmitter.

40. The system of claim 39 further comprising:

a clock transmitter adapted to receive an input clock, coupled to send an internal clock to the video transmitter, and coupled to the first end of the communications channel, for generating the internal clock from the input clock and for transmitting the input clock across the communications channel; and a clock receiver coupled to the second end of the communications channel and coupled to send an internal clock to the video receiver and to the video capture device, for receiving the input clock from the communications channel and for generating the internal clock from the input clock.

* * * * *